United States Patent
Yoon et al.

(10) Patent No.: US 10,893,470 B2
(45) Date of Patent: Jan. 12, 2021

(54) CONTROL INFORMATION UTILIZATION METHOD AND APPARATUS OF TERMINAL IN MOBILE COMMUNICATION SYSTEM

(71) Applicant: Samsung Electronics Co., Ltd., Suwon-si (KR)

(72) Inventors: Suha Yoon, Seoul (KR); Suyoung Park, Uiwang-si (KR); Sunghyuk Shin, Seongnam-si (KR); Euichang Jung, Seoul (KR); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 15/431,188

(22) Filed: Feb. 13, 2017

(65) Prior Publication Data
US 2017/0238249 A1    Aug. 17, 2017

(30) Foreign Application Priority Data
Feb. 12, 2016  (KR) .......................... 10-2016-0016274

(51) Int. Cl.
*H04W 52/02* (2009.01)
*H04W 74/00* (2009.01)
*H04Q 9/04* (2006.01)

(52) U.S. Cl.
CPC .......... *H04W 52/0206* (2013.01); *H04Q 9/04* (2013.01); *H04W 74/006* (2013.01); *H04Q 2213/13215* (2013.01); *Y02D 30/70* (2020.08)

(58) Field of Classification Search
CPC ......... H04W 36/0016; H04W 36/0033; H04W 88/16; H04W 36/0022; H04W 88/02; H04N 5/3572; H04N 5/3575

USPC .......................................................... 370/331
See application file for complete search history.

(56) References Cited

U.S. PATENT DOCUMENTS

| | | | |
|---|---|---|---|
| 2009/0225696 A1* | 9/2009 | Ramachandran | H04W 74/0816 370/328 |
| 2013/0273857 A1* | 10/2013 | Zhang | H04B 15/00 455/73 |
| 2014/0341207 A1 | 11/2014 | Bhushan et al. | |
| 2015/0085683 A1 | 3/2015 | Sadek et al. | |
| 2015/0085684 A1 | 3/2015 | Sadek | |
| 2015/0085841 A1 | 3/2015 | Sadek | |
| 2015/0105067 A1 | 4/2015 | Valliappan et al. | |
| 2015/0131462 A1* | 5/2015 | Puranik | H04W 52/0212 370/252 |
| 2015/0163801 A1 | 6/2015 | Sadek | |
| 2016/0134880 A1* | 5/2016 | Chengalvala | H04N 19/44 375/240.25 |

(Continued)

*Primary Examiner* — Huy D Vu
*Assistant Examiner* — Nizam U Ahmed
(74) *Attorney, Agent, or Firm* — Jefferson IP Law, LLP

(57) ABSTRACT

A control information utilization method and an apparatus of a terminal with heterogenous technology communication modules operating in a same frequency band are provided to protect against unnecessary battery power consumption. A control information reception method of a terminal includes receiving control information from a base station using a first module, determining a channel occupancy time based on the control information using a licensed assisted access (LAA) radio identifier, and transferring the channel occupancy time to a second module that is operating in a same frequency band as the first module.

12 Claims, 24 Drawing Sheets

(56) References Cited

U.S. PATENT DOCUMENTS

2016/0227571 A1* 8/2016 Baek ...................... H04W 48/20
2016/0227578 A1* 8/2016 Lee ...................... H04W 74/004
2016/0353360 A1* 12/2016 Lee ...................... H04W 72/085
2017/0339641 A1* 11/2017 Nigam .............. H04W 52/0216
2018/0249497 A1* 8/2018 Noh .................. H04W 72/0446

* cited by examiner

FIG. 9B

| Frame Control | Duration | RA | TA | FCS |
|---|---|---|---|---|

| Frame Control | Duration | RA | FCS |
|---|---|---|---|

| Frame Control | Duration ID | Address #1 | Address #2 | Address #3 | Sequence Control | Address #4 | Qos Control | Frame Body | FCS |
|---|---|---|---|---|---|---|---|---|---|

CONTROL INFORMATION UTILIZATION METHOD AND APPARATUS OF TERMINAL IN MOBILE COMMUNICATION SYSTEM

CROSS-REFERENCE TO RELATED APPLICATION(S)

This application claims the benefit under 35 U.S.C. § 119(a) of a Korean patent application filed on Feb. 12, 2016 in the Korean Intellectual Property Office and assigned Serial number 10-2016-0016274, the entire disclosure of which is hereby incorporated by reference.

TECHNICAL FIELD

The present disclosure relates to a mobile communication system. More particularly, the present disclosure relates to a control information utilization method and an apparatus that is capable of allowing a terminal with heterogenous technology communication modules operating in the same frequency band to protect against unnecessary battery power consumption.

BACKGROUND

Mobile communication systems were developed to provide subscribers with voice communication services on the move. Recently, mobile communication systems have evolved to the level of supporting high speed data communication services beyond the early voice-oriented services. However, the resource shortage and user requirements for higher speed services are spurring evolution towards increasingly more advanced mobile communication systems.

Meanwhile, unlike voice services, data services are provided using resources determined based on the transmit data amount and channel condition. Accordingly, a wireless communication system, particularly a cellular communication system, is provided with a scheduler, which takes charge of resource allocation based on the required resource amount, channel condition, data amount, and the like. In most cellular communication systems, typically the scheduler is located in base stations for radio resource management, and this is the case even in the long-term evolution (LTE) system as one of the next generation mobile communication systems.

Recently, a technique called licensed assisted access (LAA) has been proposed to improve frequency utilization efficiency by using carrier aggregation (CA) across licensed and unlicensed bands.

In an LTE system, although the frequency owner may use the frequency resources exclusively in a way as intended for operating on a licensed frequency, in the case of the communication devices operating in an unlicensed band, those devices have to operate on a shared frequency channel; thus, there is a need of a method for sharing the channel without collision. Listen before talk (LBT) is a technique for sensing a radio channel and, if the channel is not in use, starting transmission. Here, the operation of determining whether the channel is occupied by another communication device is called channel sensing or clear channel assessment (CCA).

Meanwhile, a terminal may include a wireless local area network (WLAN) communication module taking charge of Wi-Fi communication and an LAA communication module taking charge of the LAA function, and both the two communication modules have to perform channel sensing for communication on the frequency of the unlicensed band (unlicensed frequency band). The LAA module may determine whether the channel is occupied and, if so, check channel occupancy time based on the control information from an LTE base station. In practice, terminals have different capabilities based on what standards they support; thus, some terminals can decode the control information to check their channel occupancy time while others cannot.

In addition, the WLAN communication module and the LAA communication module operate in the same frequency band. Accordingly, if both the two communication modules operate to check the channel occupancy time on the same unlicensed channel, this will result in unnecessary battery consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a control information utilization method and an apparatus that is capable of allowing all terminals operating in a frequency band to check their channel occupancy times on unlicensed frequency based on the control information using a licensed assisted access (LAA)-radio identifier allocated commonly to heterogeneous communication modules of a terminal.

In addition, the present disclosure aims to provide a control information utilization method and an apparatus that is capable of reducing battery power consumption in such a way of allowing a terminal equipped with two heterogeneous communication modules operating on the same frequency to use the information on the unlicensed band frequency occupancy status sensed by one communication module for the operation of the other communication module.

In accordance with an aspect of the present disclosure, a control information reception method of a terminal is provided for use in a mobile communication system. The method includes receiving control information from a base station using a first module, identifying channel occupancy time based on the control information using a LAA radio identifier, and transferring the channel occupancy time to a second module that is operating in the same frequency band as the first module.

In accordance with another aspect of the present disclosure, a control information transmission method of a base station is provided for use in a mobile communication system. The method includes checking scheduling information for terminals operating in a first frequency band, determining a channel occupancy time for each terminal based on the scheduling information, generating control information with the channel occupancy time and a LAA radio identifier, and transmitting the control information to the terminal, wherein the channel occupancy time is received by a first module of the terminal and transferred to a second module operating in the same frequency band as the first module.

In accordance with another aspect of the present disclosure, a terminal for receiving control information in a mobile communication system is provided. The terminal includes a first module which performs a first radio communication, a second module which performs a second radio communication, and at least one processor configured to control the first module to receive control information from a base station, identify channel occupancy information based on the control information with a LAA radio identifier, and transmit the channel occupancy time to the second module, the first module and the second module operating in the same frequency band.

In accordance with another aspect of the present disclosure, a base station for transmitting control information in a mobile communication system is provided. The base station includes a transceiver which performs communication with another network entity and at least one processor configured to determine scheduling information for terminals operating in a first frequency band, determine channel occupancy time for each terminal based on the scheduling information, generate control information with the channel occupancy time and a LAA radio identifier, and control the transceiver to transmit the control information to the terminal, wherein the channel occupancy time is received by a first module of the terminal and transferred to a second module that is operating in the same frequency band as the first module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9B is a diagram illustrating control and data packet structures according to an embodiment of the present disclosure;

Throughout the drawings, like reference numerals will be understood to refer to like parts, components, and structures.

DETAILED DESCRIPTION

Figure 1:
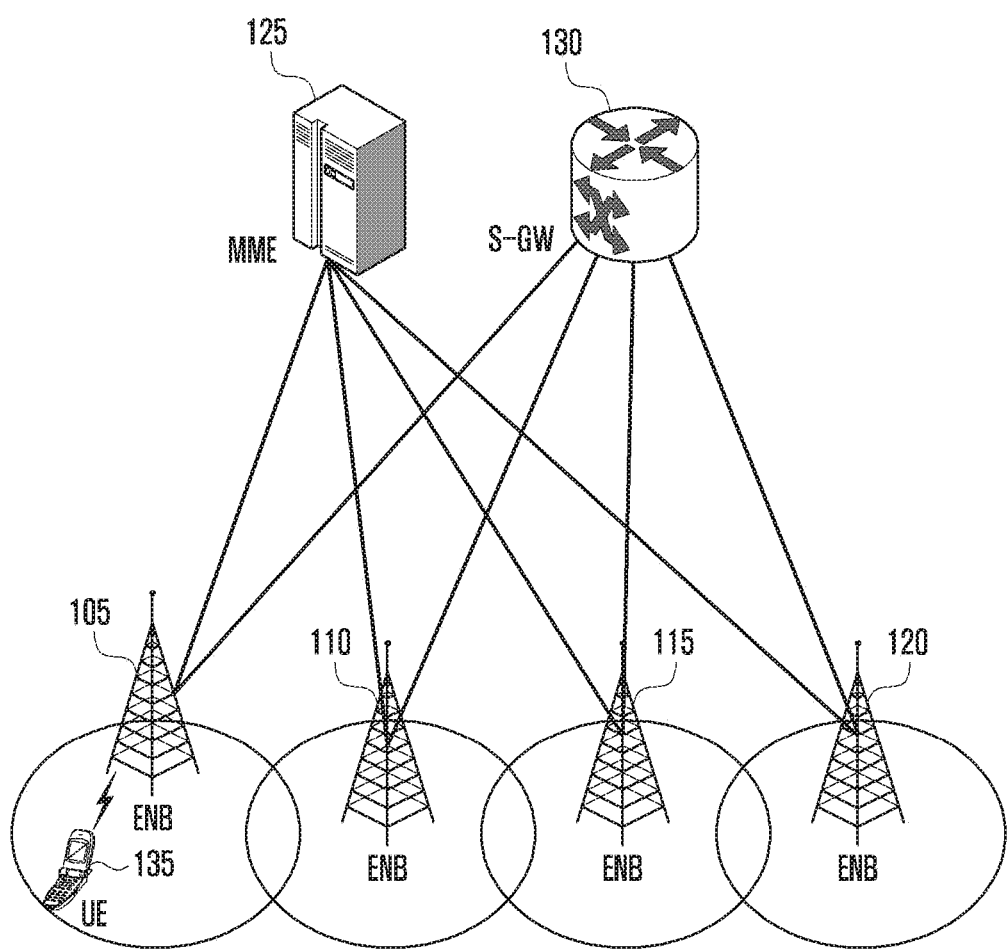
FIG. 1 is a diagram illustrating long term evolution (LTE) system architecture according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a" "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that each block of the flowchart and/or block diagrams, and combinations of blocks in the flowchart and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module" according to the embodiments of the disclosure, means, but is not limited to, a software or hardware component, such as a field programmable gate array (FPGA) or application specific integrated circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

FIG. 1 is a diagram illustrating long term evolution (LTE) system architecture to which the present disclosure is applied.

Referring to FIG. 1, a radio access network (RAN) of the LTE system includes evolved Node Bs (eNBs) 105, 110, 115, and 120, a mobility management entity (MME) 125, and a Serving Gateway (S-GW) 130. The user equipment (UE) 135 connects to an external network via the eNBs 105, 110, 115, and 120 and the S-GW 130.

The eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system, all user traffic including real time services, such as voice over IP (VoIP) is served through a shared channel, thus, there is a need of an entity capable of collecting per-UE state information (such as buffer status, allowed transmission power state, and channel status) and scheduling the UEs based on the state information, and the eNBs 105, 110, 115, and 120 are responsible for these functions. Typically, one eNB has multiple cells. The LTE system adopts orthogonal frequency division multiplexing (OFDM) as a radio access technology in order to secure a data rate of up to 100 Mbps with a bandwidth of 20 MHz. The LTE system also adopts adaptive modulation and coding (AMC) to determine the modulation scheme and channel coding rate in adaptation to the channel condition of the UE. The S-GW 130 is an entity that provides data bearers to establish and release data bearers under the control of the MME 125. The MME 125 is responsible for various control functions and maintains connections with a plurality of eNBs.

Figure 2:
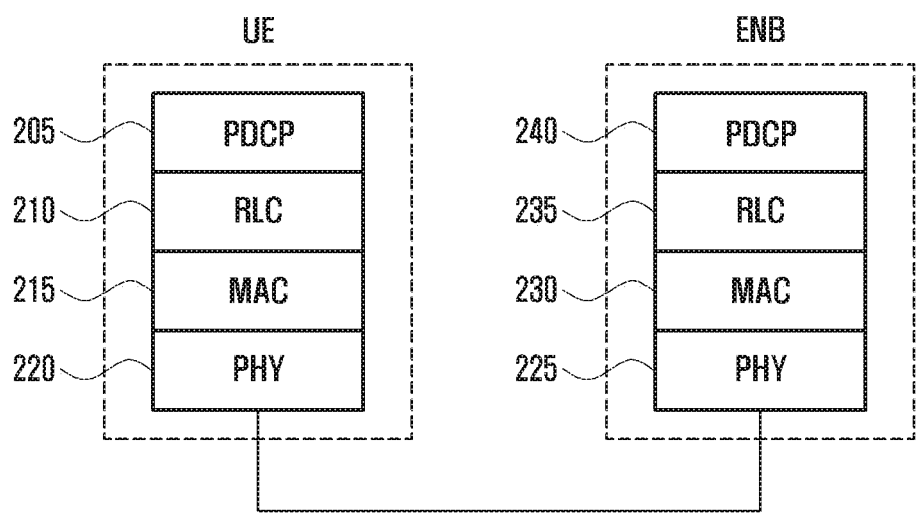
FIG. 2 is a diagram illustrating a protocol stack of an interface between a user equipment (UE) and an evolved node B (eNB) in LTE system according to an embodiment of the present disclosure.

FIG. 2 is a diagram illustrating a protocol stack of an interface between a UE and an eNB in LTE system to which the present disclosure is applied.

Referring to FIG. 2, the protocol stack of the interface between the UE and the eNB in the LTE system includes a plurality of protocol layers stacked from the bottom to the top physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240. The PDCP layer denoted by reference numbers 205 and 240 takes charge of compressing/decompressing an IP header, and the RLC layer denoted by reference numbers 210 and 235 takes charge of segmenting a PDCP Packet Data Unit (PDU) into segments of appropriate size. The MAC layer denoted by reference number 215 and 230 allows for connection of multiple RLC entities and takes charge of multiplexing RLC PDUs from the RLC layer into a MAC PDU and demultiplexing a MAC PDU into RLC PDUs. The PHY layer denoted by reference numbers 220 and 225 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer denoted by reference numbers 220 and 225 uses hybrid automatic repeat request (HARQ) for additional error correction by transmitting 1-bit information indicating positive or negative acknowledgement about data packets, the acknowledgement being transmitted from the receiver to the transmitter. The 1-bit information is referred to as HARQ acknowledgement/negative acknowledgement (ACK/NACK). The downlink HARQ ACK/NACK corresponding to an uplink transmission may be transmitted in physical hybrid-ARQ indicator channel (PHICH), and the uplink HARQ ACK/NACK corresponding to a downlink transmission may be transmitted in physical uplink control channel (PUCCH) or physical uplink shared channel (PUSCH).

Figure 3:
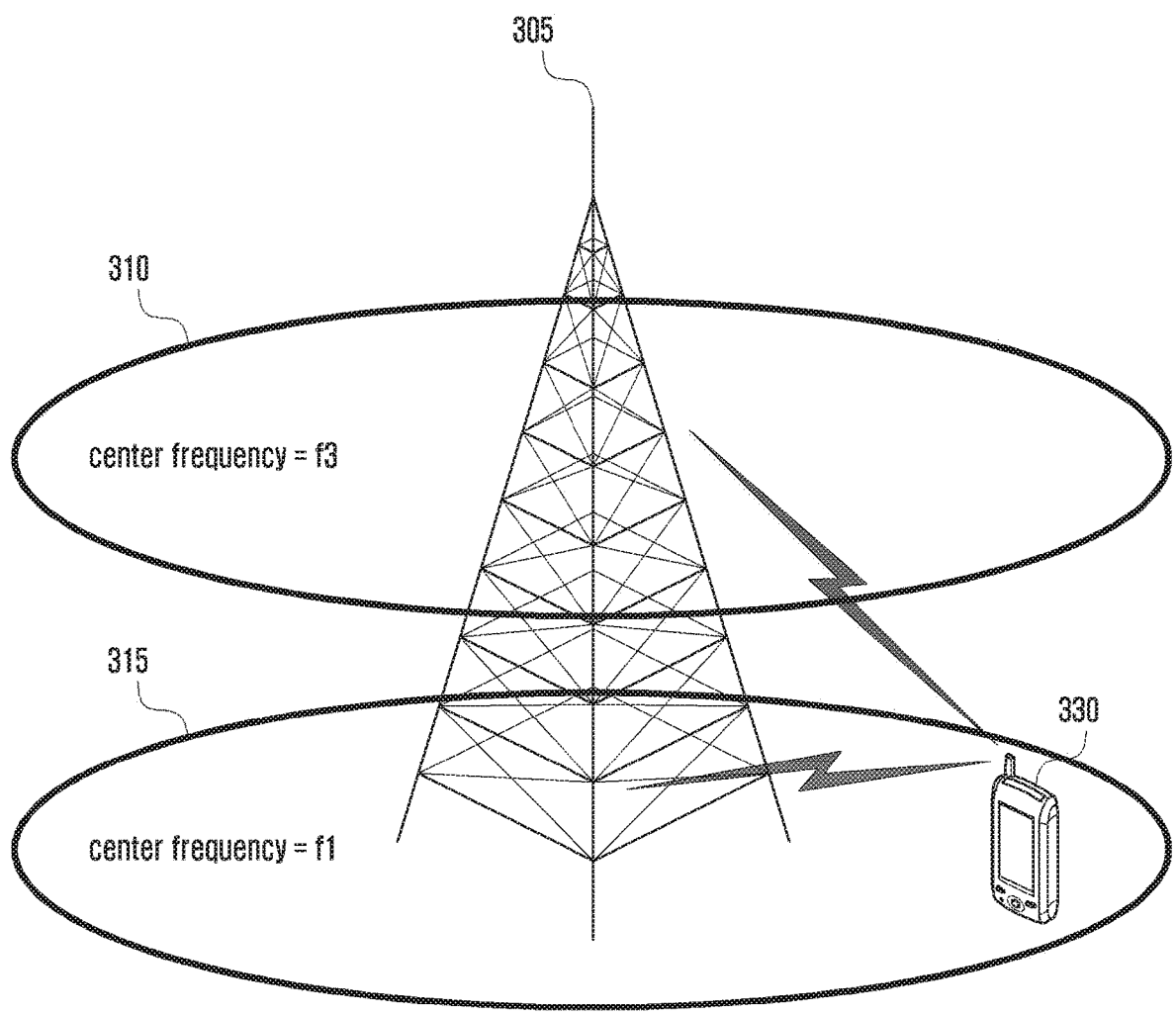
FIG. 3 is a diagram illustrating a carrier aggregation of a UE according to an embodiment of the present disclosure.

FIG. 3 is a diagram illustrating a carrier aggregation of a UE according to an embodiment of the present disclosure.

Referring to FIG. 3, an eNB transmits and receives signals through multiple carriers across a plurality of frequency bands. For example, when an eNB 305 is configured to use a downlink carrier 315 with center frequency f1 and a downlink carrier 310 with center frequency f3, the UE receives data on one of the two carriers according to the related art. However, a CA-enabled UE 330 is capable of transmitting/receiving data over multiple carriers simultaneously.

In an LAA system, however, an eNB is capable of aggregating unlicensed band and licensed band carriers for data communication with a UE. Accordingly, a CA-enabled UE can transmit and receive data on the licensed and unlicensed band carriers simultaneously. In this way, it is possible to improve data transmission efficiency by aggregating carriers across licensed and unlicensed frequency bands.

Figure 4:
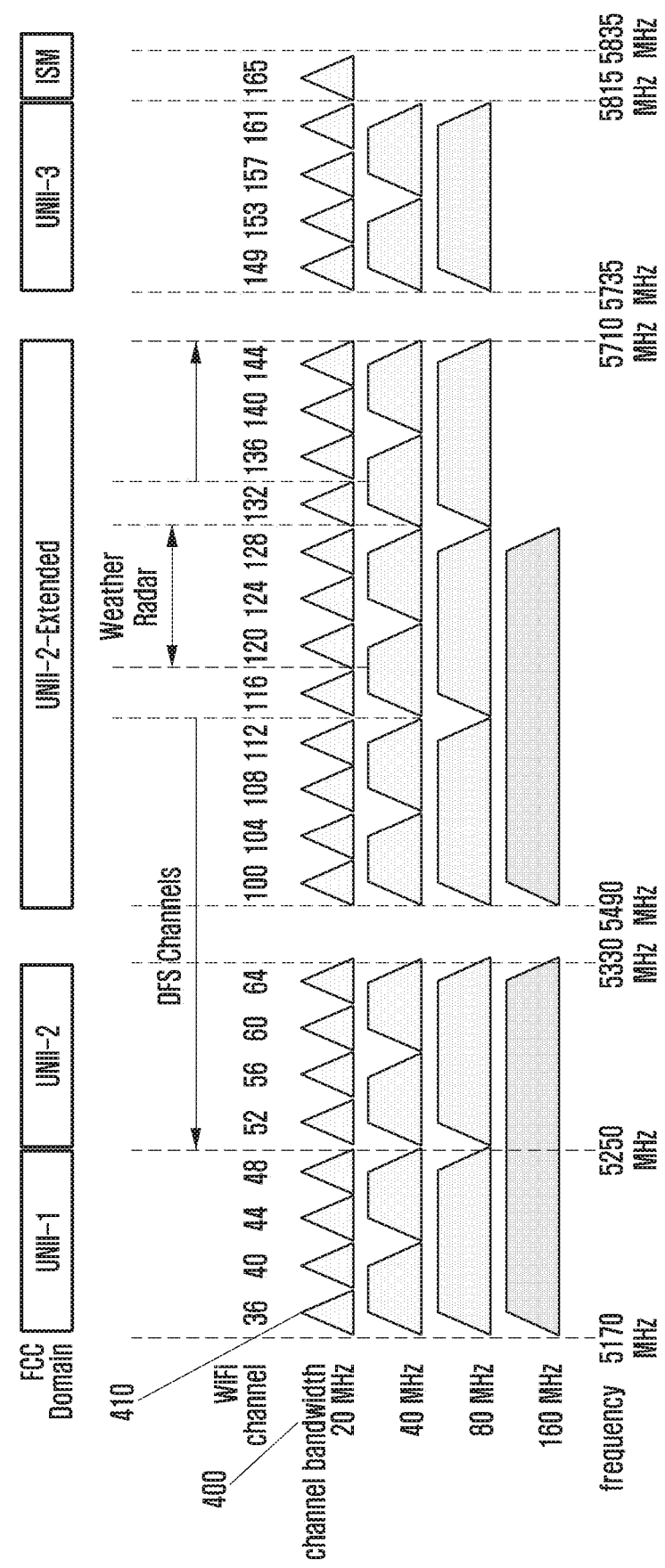
FIG. 4 is a diagram illustrating a structure of unlicensed frequency channels according to an embodiment of the present disclosure.

FIG. 4 is a diagram illustrating a structure of unlicensed frequency channels according to an embodiment of the present disclosure.

In many countries, bandwidths of about 500 MHz are allocated for the purpose of unlicensed communication in the frequency band of 5 GHz.

Referring to FIG. 4, a total of 25 carriers 410 having a bandwidth of 20 MHz as denoted by reference number 400 constitute the bandwidth of 500 MHz. By taking notice that an LTE communication system supports CA of up to 32 carriers, if the CA is extended to the unlicensed band, it is possible to use sider frequency resources.

Figure 5:
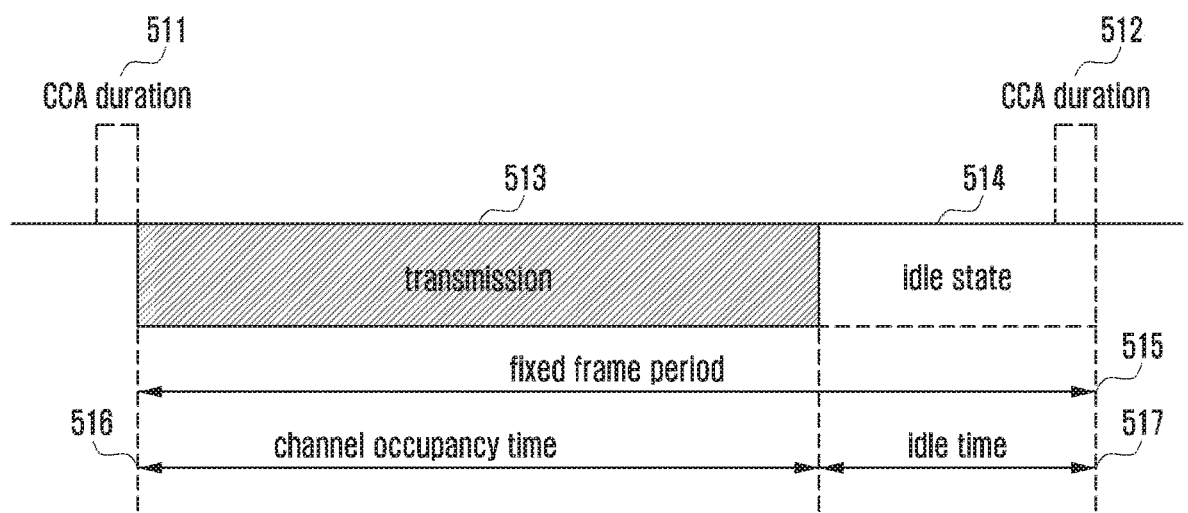
FIG. 5 is a diagram illustrating channel sensing for determining whether the channel is occupied in a licensed assisted access (LAA) system according to an embodiment of the present disclosure.

FIG. 5 is a diagram illustrating channel sensing for determining whether the channel is occupied in an LAA system according to an embodiment of the present disclosure.

The LTE communication system operating in a licensed frequency band uses the given frequency resource in a way wanted by the frequency owner. However, a communication device operating in an unlicensed frequency band shared with other devices has to sense the frequency band to determine whether it is occupied by another device. The operation of determining whether the channel is occupied or clear is called CCA or channel sensing.

Referring to FIG. 5 shows a procedure in which an eNB or a terminal determines whether the unlicensed frequency band is occupied and transmits data in the unlicensed frequency band. The eNB or the UE may perform CCA during CCA periods 511 and 512 to determine whether the unlicensed frequency is occupied. The CCA period 511 may be equal to or greater than a predetermined time (e.g., 20 μs).

In an embodiment of the present disclosure, it is assumed that a UE performs channel sensing to determine whether the unlicensed frequency band is occupied. The UE may measure energy in the unlicensed frequency band to determine whether the unlicensed frequency band is occupied. If the measured energy level is equal to or less than a predetermined threshold level, the UE determines non-occupancy and transmits data in the unlicensed band as denoted by reference number 513. Here, the time period in which the UE transmits data is referred to as channel occupancy time 516.

The UE occupies the unlicensed band during a minimum 1 ms up to 10 ms for CCA and then has to stay in an idle state 514, as long as a minimum 5% of the channel occupancy time 516, without transmission. The fixed frame period is denoted by reference number 515 and the period of the idle state is referred to as idle period as denoted by reference number 517.

Alternatively, if the energy level is greater than the threshold level, the UE decodes the control information received from the eNB to determine whether the unlicensed frequency band is occupied and, if so, checks the channel occupancy time.

The UE may check the channel occupancy time based on the control information received from a Wi-Fi access point (AP), a Wi-Fi station, or an LTE eNB. The control information from the LTE eNB may be transmitted through a control channel (e.g., PDCCH). However, the control information received through the PDCCH can be decoded by specific UEs, which can check the channel occupancy time based on the control information received using the resources allocated thereto during a corresponding time. This means that other UEs sharing the same frequency band cannot use the control information, and the present disclosure proposes a method for a plurality of UEs sharing the same unlicensed frequency band to receive the control information and check channel occupancy information based on the control information.

In addition, the WLAN communication module and the LAA communication module may operate in the same frequency band. For example, both the LAA communication module and the WLAN communication module may operate in a frequency band of 5 Ghz. In addition, the LAA communication module may operate in a frequency band of 60 Ghz in which an Institute of Electrical and Electronics Engineers (IEEE) 802.11ad or wireless gigabit alliance (WiGig) module operates. In this situation, if both the WLAN communication module and LAA communication module perform channel sensing to determine whether the unlicensed frequency band is occupied, this causes unnecessary battery consumption. The present disclosure proposes a control information utilization method capable of allowing the WLAN and LAA communication modules to share the information on the channel occupancy in the unlicensed frequency band that is sensed by one of the two communication modules.

Figure 6A:
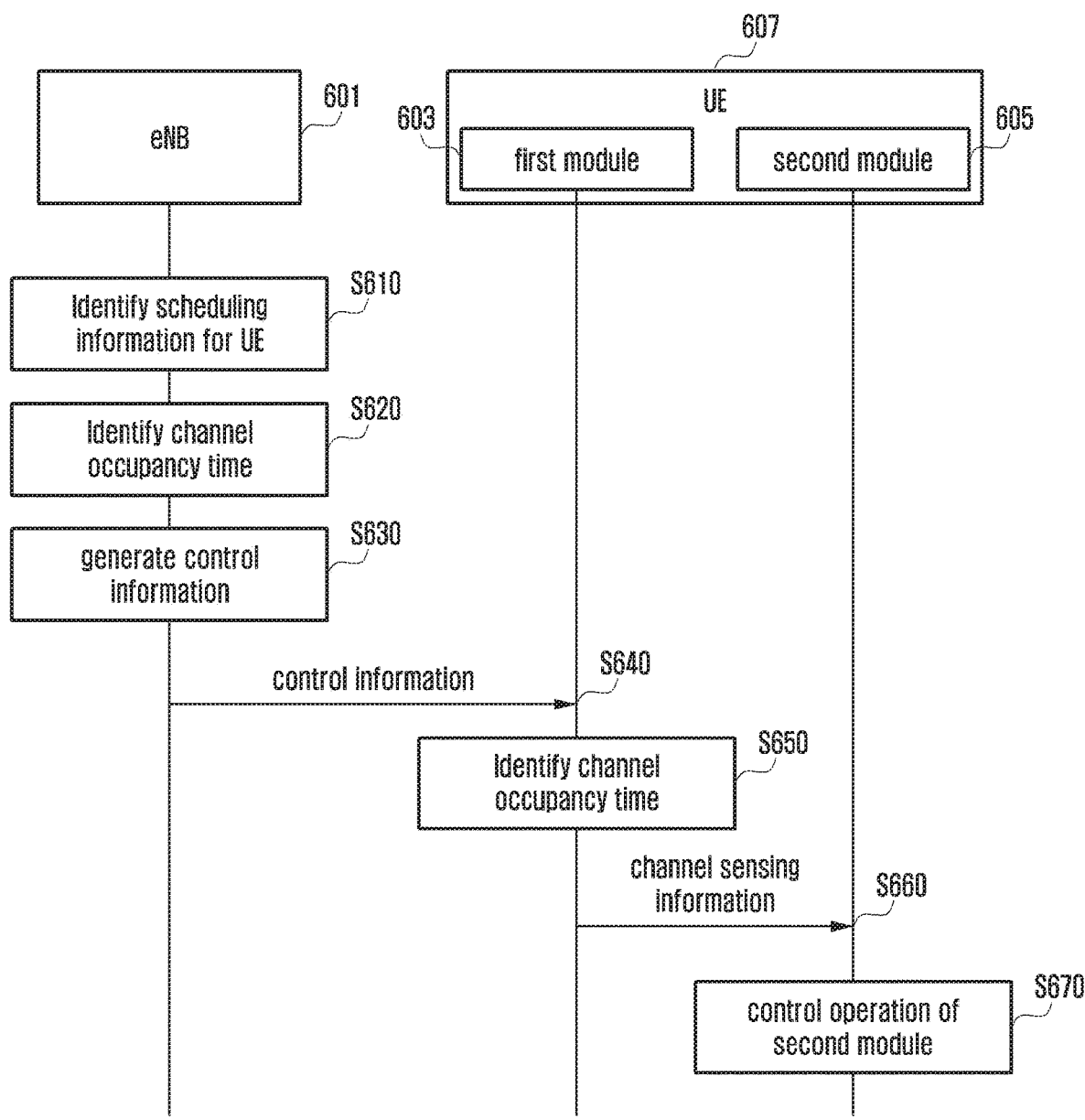
FIG. 6A is a signal flow diagram illustrating a method for communicating control information according to an embodiment of the present disclosure.

FIG. 6A is a signal flow diagram illustrating a method for communicating control information according to an embodiment of the present disclosure.

Referring to FIG. 6A, an eNB 601 may identify the scheduling information of the UEs in communication therewith in the same frequency band (hereinafter, referred to as first frequency band) at operation S610. In an embodiment of the present disclosure, the eNB may be an LAA eNB or an LTE eNB. However, the eNB is not limited thereto and may be any type of base station, such as Wi-Fi AP. The first frequency band may be an unlicensed frequency band, e.g., a frequency of an unlicensed band for use by the UE in an LAA system.

After checking the scheduling information, the eNB 601 may identify the channel occupancy times of all UEs in communication therewith in the first frequency band at operation S620. The channel occupancy time may denote the time period allowed for downlink transmission of the eNB 601 or uplink transmission of each UE in the first frequency band.

After checking the channel occupancy time, the eNB 601 at operation S630 may generate control information including common channel occupancy time for all of the UEs. More particularly, the eNB may add cyclic redundancy check (CRC) to transmission information including the channel occupancy time and scramble the CRC with a radio identifier to generate the control information.

In the case of transmitting the control information through a PDCCH, the channel occupancy time included in the control information may be changed every subframe. For example, it may be assumed that downlink transmission is performed during 4 ms (i.e., channel occupancy time is 4 ms) in the unlicensed band. In this case, the eNB may transmit the control information including the channel occupancy time set to 4 to the UE through the PDCCH in the first subframe. The eNB may also transmit the control information including the channel occupancy time set to 3 to the UE through the PDCCH in the second subframe. The eNB may also transmit the control information including the channel occupancy time set to 2 to the UE through the PDCCH in the third subframe. The eNB may also transmit the control information including the channel occupancy time set to 1 to the UE through the PDCCH in the fourth subframe.

The UE may check the channel occupancy time included in the control information received through the PDCCH in the first subframe and stop channel sensing during the period of 4 ms. However, although the UE fails to receive the control information through the PDCCH in the first subframe, it may stop channel sensing during the period of 3 ms based on the control information received through the PDCCH in the second subframe.

An embodiment of the present disclosure, the control information may include downlink control information (DCI). The DCI may be configured to carry the information on the channel occupancy time using a field of a certain DCI format. It may also be possible to define a new field indicating the channel occupancy time in a certain DCI format.

However, the scope of the present disclosure is not limited thereto, and it may be applicable to uplink control information and separately generated control information. How to generate the control information is described later in detail.

After generating the control information, the eNB 601 may transmit the control information to the UE at operation S640. A UE 607 may include a first module 603 for performing a first radio communication and a second module 605 for performing a second radio communication. In this embodiment of the present disclosure, it is assumed that the UE 607 performs the first radio communication with the eNB 601 by means of the first module 603, which receives the control information. In this embodiment of the present disclosure, the first module 603 of the UE 607 may be an LAA communication module. However, the present disclosure is not limited thereby and may include a case where the UE receives the control information from a Wi-Fi AP or a terminal in Wi-Fi communication (Wi-Fi Station) by means of a WLAN communication module.

The eNB 601 may transmit the control information through a control channel, a data channel, or a separate channel at operation S640.

The eNB 601 may also transmit the control information through a primary carrier (PCell) or a secondary carrier (SCell). The eNB 601 may transmit the control information including the unlicensed band channel occupancy time information through the PCell in two ways.

First, the eNB 601 may transmit the SCell channel occupancy time information in the PCell control information. Second, the eNB 601 may transmit the SCell control information including the unlicensed band channel occupancy time through the PCell (cross carrier scheduling in LTE).

A description is made of the control information transmission procedure in detail hereinafter with reference to FIG. 6B.

Figure 6B:
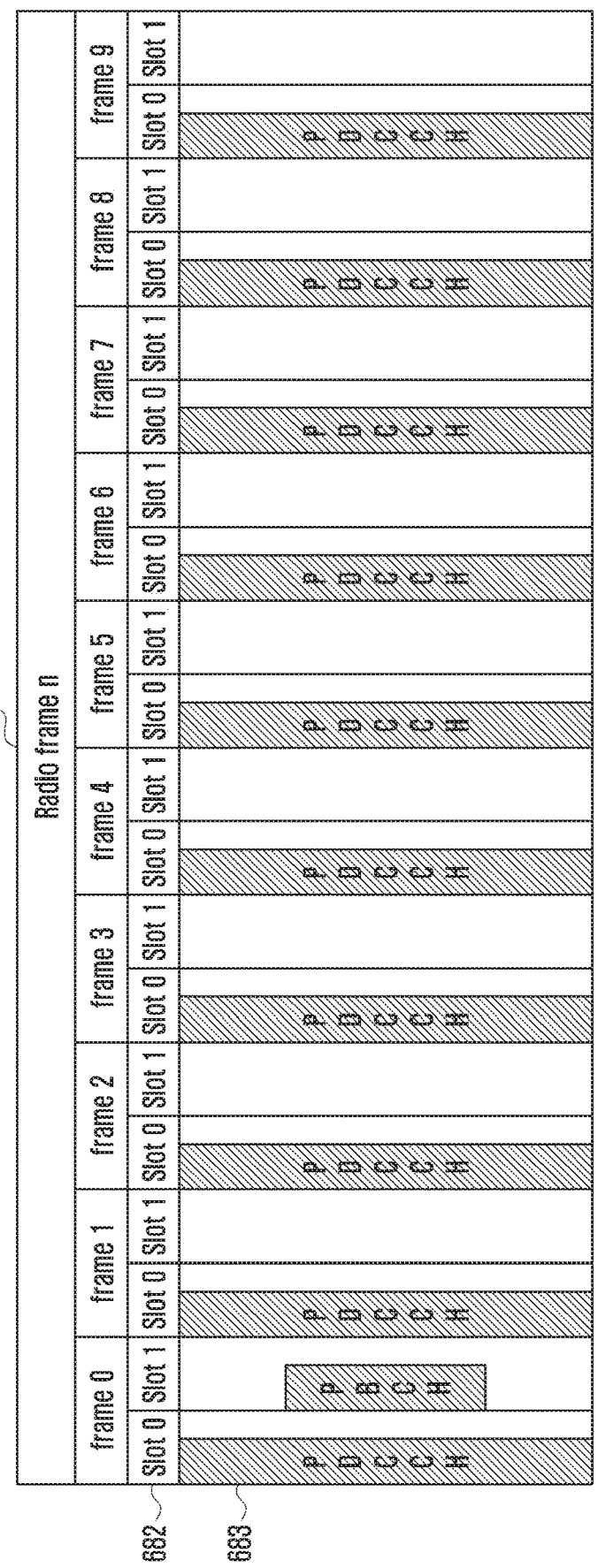
FIG. 6B is a diagram illustrating a radio frame structure of an LTE system according to an embodiment of the present disclosure.

FIG. 6B is a diagram illustrating a radio frame structure of an LTE system according to an embodiment of the present disclosure. A radio frame 681 consists of 10 subframes. A subframe 682 is 1 ms and consists of two slots (slot 0 and slot 1). The control channel is placed at the beginning of each subframe. In reference to FIG. 6B, reference number 683 denotes a region for PDCCH as a control channel. A control channel signal is mapped to the first L OFDM symbols in the subframe.

Referring to FIG. 6B, the eNB may generate the control information and transmit the control signal through the PDCCH. Meanwhile, an enhanced PDCCH (ePDCCH) may be mapped to a data channel region for transmitting control information. Accordingly, the eNB may transmit the control information through the data channel. It may also be possible for the eNB to transmit the control information through a physical broadcast channel (PBCH) located in the data channel region. It may also be possible for the eNB to transmit the control information using a channel defined separately for transmitting the channel occupancy time information. An embodiment of the present disclosure is directed to the case where the eNB transmits the control information in the PDCCH region.

Referring to FIG. 6A, if the eNB 601 transmits the control information through the PDCCH, only the designated UE can decode the control information. Accordingly, only the UE allocated radio resources for the time period during which the eNB transmits the control information can check the control information. This means that other UEs operating in the first frequency band cannot check whether the corresponding frequency band is occupied or clear.

The present disclosure proposes a control channel utilization method that is capable of generating the control information with a newly defined radio identifier at operation S630. The new radio identifier (radio network temporary identifier (RNTI)) is defined such that all of the UEs operating in the first frequency band can decode the control information, and this identifier is referred to as LAA-radio identifier (or LAA-RNTI). The eNB may scramble the CRC added to the transmission information including the channel occupancy time with the LAA-RNTI to generate the control information. The eNB may map the control information to a common search space of the PDCCH such that all of the UEs can receive and decode the control information. It may be possible to allocate a value to a region reserved for defining the LAA-RNTI newly. The LAA-RNTI may be carried in a field included in the control information. In detail, the LAA-RNTI may be carried in a field included in the DCI. The LAA-RNTI may be defined as shown in Tables 1 and 2.

TABLE 1

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI (see note) |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |

TABLE 1-continued

| Value (hexa-decimal) | RNTI |
|---|---|
| FFF4-FFFB | Reserved for future use |
| FFFC | LAA-RNTI |
| FFFD | M-RNTI |
| FFFE | P-RNTI |
| FFFF | SI-RNTI |

TABLE 2

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| eIMTA-RNTI | eIMTA TDD UL/DL configuration notification | N/A | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation, and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |
| SL-RNTI | Dynamically scheduled sidelink transmission | SL-SCH | STCH |
| LAA-RNTI | Scheduled LAA transmission and reception (aggregated) | | |

Figure 6C:
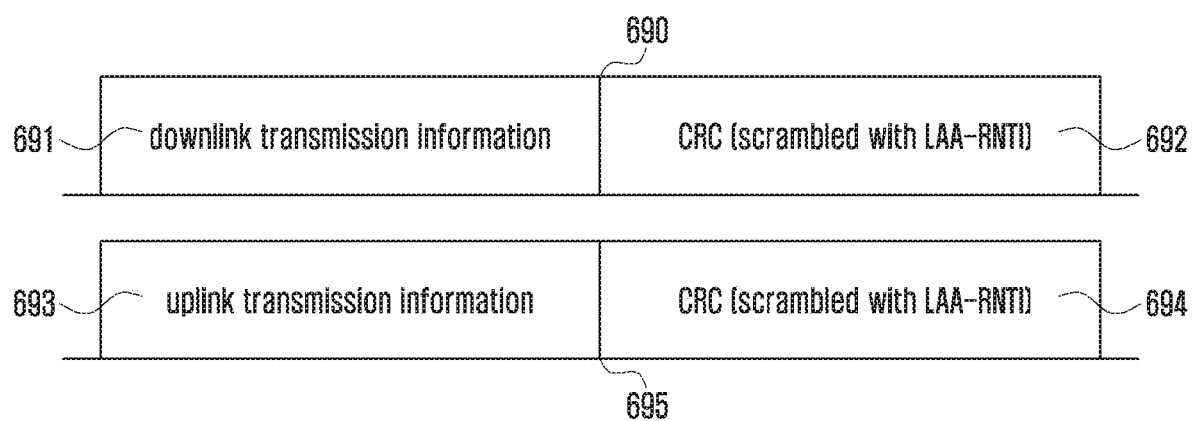
FIG. 6C is a diagram illustrating structures of control information generated with an LAA-radio network temporary identifier (LAA-RNTI) according to an embodiment of the present disclosure.

A description is made of the structure of the control information generated with the LAA-RNTI with reference to FIG. 6C.

FIG. 6C is a diagram illustrating structures of control information generated with the LAA-RNTI according to an embodiment of the present disclosure.

Referring to FIG. 6C, a reference number 690 denotes downlink control information, and reference number 695 denotes uplink control information. Downlink transmission information 691 may include unlicensed frequency band downlink control information. The downlink transmission information 691 may be the information acquired by integrating downlink transmission information of multiple UEs. The eNB may generate integrated downlink transmission information based on per-UE scheduling information, and the downlink transmission information may include channel occupancy information.

The eNB may generate the control information by scrambling a CRC 692 added to the downlink transmission information with an LAA-RNTI such that all of the UEs operating in the first frequency band can receive and decode the control information.

Similarly, the eNB may determine the uplink transmission information based on the per-UE scheduling information and generate the control information by scrambling a CRC 694 added to the uplink transmission information with the LAA-RNTI.

The downlink transmission control information 690 and uplink transmission control information 695 may be distinguished by a predetermined format (e.g., control information formats 0 and 4 for uplink control information and control information formats 1 and 2 for downlink control information) or an indicator included in the control information.

With reference again to FIG. 6A, the eNB 601 may transmit the control information generated at operation S630 to the first module 603 of the UE 607. The UE 607 may be one of the UEs operating in the first frequency band.

If the control information is received, the first module 603 of the UE 607 may decode the control information to identity the channel occupancy time at operation S650. In detail, the UE may decode the control information with the LAA-RNTI to check the channel occupancy time included in the control information.

The first module 603 may also transmit the channel sensing information including the channel occupancy time to the second module at operation S660.

If the channel sensing information is received, the second module 605 at operation S670 may control its operation during the channel occupancy time checked in the channel sensing information. For example, the second module 605 may stop channel sensing during the channel occupancy time.

The first module 603 may transmit the channel sensing information, at operation S660, to a management module, which may control the operation of the second module 605 during the channel occupancy time.

As described above, the eNB generates the control information with the LAA-RNTI and transmits the control information in the common search space of the PDCCH such that all of the UEs operating in the first frequency band can check the channel occupancy status in the unlicensed frequency band. In addition, the first module checks the unlicensed frequency band occupancy status and shares the channel occupancy time with the second module so as to negate any unnecessary channel sensing operation of the second module during the channel occupancy time, thereby improving battery utilization efficiency of the UE.

Figure 7:
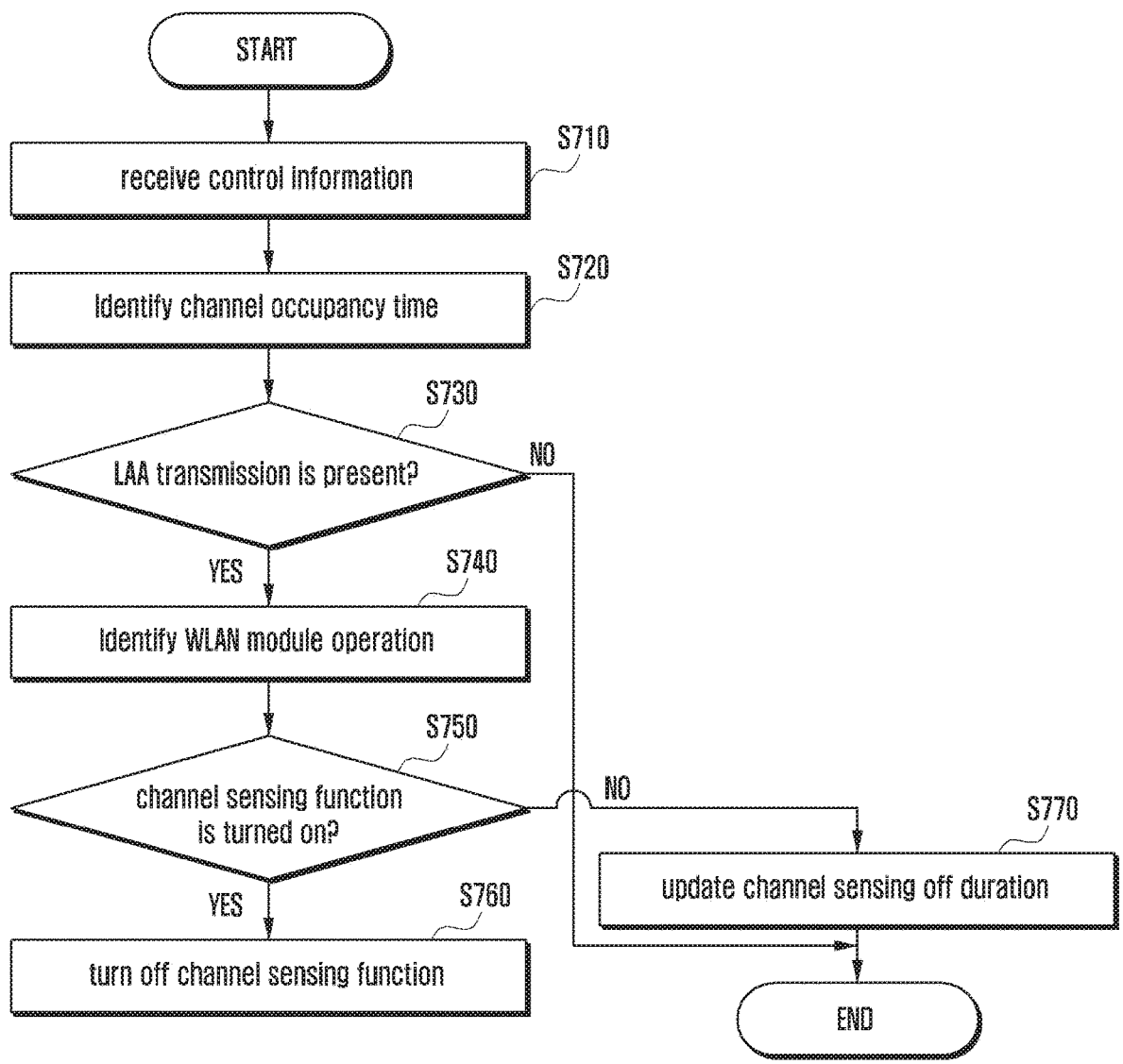
FIG. 7 is a flowchart illustrating a method for a UE to receive control information according to an embodiment of the present disclosure.

FIG. 7 is a flowchart illustrating a method for a UE to receive control information according to an embodiment of the present disclosure.

Referring to FIG. 7, the UE may receive control information from an eNB at operation S710. The eNB generates and transmits the control information as described above and thus a detailed description thereof is omitted herein.

The UE may receive the control information transmitted through a control channel, a data channel, or a separate channel during at least one subframe. For example, the UE may receive the control information through a PDCCH located in the control channel region or a PBCH located in the data channel region. The control information may be transmitted through the PDCCH in a few subframes after unlicensed frequency band downlink transmission by another UE (hereinafter, referred to as LAA transmission) rather than every PDCCH.

If the control information is received, the UE may decode the control information to identify the channel occupancy time at operation S720.

The control information may be generated in such a way of scrambling the CRC added to the downlink transmission information with an LAA-RNTI. The downlink transmission information may include the channel occupancy time. Accordingly, the UE may decode the control information with the LAA-RNTI to check the channel occupancy time.

After checking the channel occupancy time, the UE may determine at operation S730 whether there is any LAA transmission. For example, if the received control information includes no downlink transmission information or if the channel occupancy time included in the downlink transmission information is set to 0, the UE may determine that there is no downlink transmission from another UE on the unlicensed frequency and thus end the procedure.

If it is determined that there is any LAA transmission, the UE may identify the operation of the WLAN communication module at operation S740. If there is any LAA transmission, this means that another UE has occupied the unlicensed frequency, and the UE controls the WLAN communication module to not perform an unnecessary operation.

The UE may determine at operation S750 whether the channel sensing function of the WLAN communication module is turned on. Since the LAA communication module and WLAN communication module operate in the same frequency band, if there is any LAA transmission, it is not necessary for the WLAN communication module to perform channel sensing.

Accordingly, if it is determined that the channel sensing function of the WLAN communication module is turned on, the UE may control the WLAN communication module to turn off its channel sensing function, at operation S760, during the channel occupancy time. It may also be possible for a management module of the UE to control the WLAN communication module to turn off its channel sensing function. If a transceiver of the WLAN communication module receives the channel sensing information including the channel occupancy time and transmits the channel sensing information to a controller of the WLAN communication module, the controller of the WLAN communication module may control to turn off the channel sensing function of the WLAN communication module.

If it is determined at operation S750 that the channel sensing function is turned off, the UE may update an off duration of the channel sensing function at operation S770. For example, if the channel sensing function has been turned off already, the UE may update the duration for maintaining the off state of the channel sensing function to be equal to the channel occupancy time. Accordingly, the UE may stop channel sensing during the updated duration.

Figure 8:
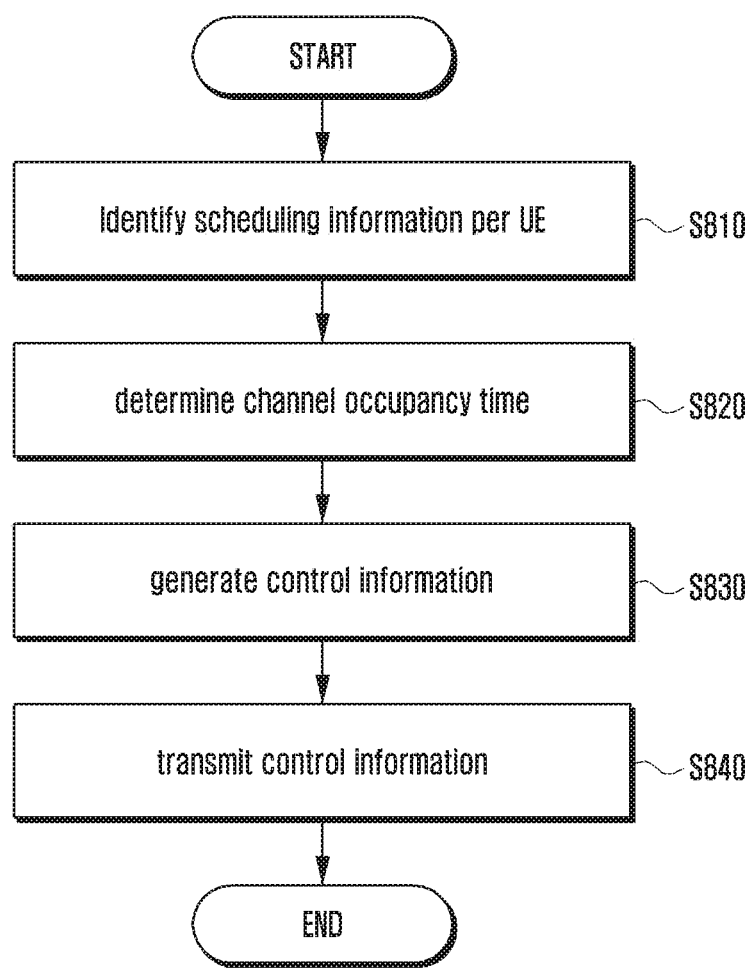
FIG. 8 is a flowchart illustrating a method for an eNB to generate and transmit control information according to an embodiment of the present disclosure.

FIG. 8 is a flowchart illustrating a method for an eNB to generate and transmit control information according to an embodiment of the present disclosure.

Referring to FIG. 8, the eNB may identify the scheduling information of a UE in communication with the eNB in a first frequency band at operation S810. For example, the eNB may include an LAA communication module which may check the scheduling information of the UE capable of communication in an unlicensed frequency band.

At operation S820, the eNB may determine an integrated channel occupancy time for all UEs operating in the first frequency band based on the scheduling information.

After determining the channel occupancy time, the eNB may generate control information with the channel occupancy time and an LAA-RNTI at operation S830. The eNB may add CRC to downlink transmission information including the channel occupancy time and scramble the CRC with the LAA-RNTI to generate the control information. The scrambling with the LAA-RNTI makes it possible for all UEs to receive and decode the control information to check the channel occupancy information.

After generating the control information, the eNB may transmit the control information to the UE at operation S840. A UE operating in the first frequency band may receive the control information transmitted by the eNB by means of its first module. The eNB maps the control information to the common search space of a PDCCH such that all UEs can receive the control information. The eNB may also transmit the control information through another control channel other than PDCCH, a data channel, or a separate channel during at least one subframe.

Through the above-described method, all of the UEs operating in the first frequency band can receive the control information to check channel occupancy status in the unlicensed frequency band.

Figure 9A:
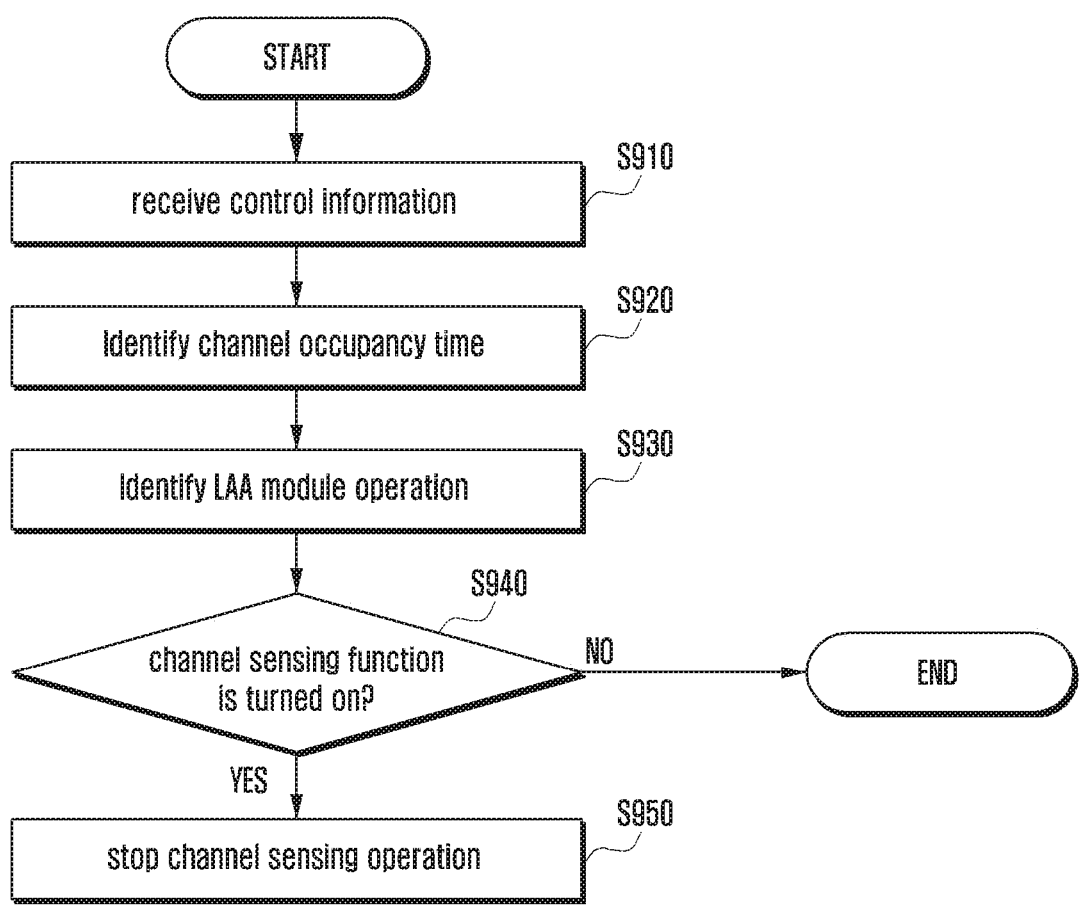
FIG. 9A is a flowchart illustrating a method for a UE to receive control information according to an embodiment of the present disclosure.

FIG. 9A is a flowchart illustrating a method for a UE to receive control information according to an embodiment of the present disclosure.

This embodiment is directed to a method for a WLAN communication module to check channel occupancy status in an unlicensed frequency band for sharing the channel occupancy status information with an LAA communication module.

Referring to FIG. 9A, the UE may receive control information from a Wi-Fi AP or a Wi-Fi Station at operation S910.

The control information transmitted by the Wi-Fi AP or Wi-Fi Station may include a request-to-send (RTS) packet or a clear-to-send (CTS) packet. The RTS packet is transmitted by a transmitter to check whether another node is transmitting before initiating data transmission. The CTS packet is transmitted by the receiver, which receives an RTS packet but is not in communication, to notify the transmitter that data transmission is possible. In this embodiment of the present disclosure, an eNB or a UE may transmit the channel occupancy time information using the RTS or CTS packet.

If the control information is received, the UE may identify the channel occupancy time based on the control information at operation S920. In detail, the RTS or CTS packet carrying the control information may include a duration field that the Wi-Fi AP or Wi-Fi Station may use to provide information of the channel occupancy time acquired through channel sensing. In this case, the UE may check the channel occupancy time based on the information contained in the duration field of the RTS or CTS packet.

The Wi-Fi AP or Wi-Fi Station may transmit to the UE a data packet with the duration field containing the channel occupancy time, and the UE may check the channel occupancy time contained in the duration field of the data packet.

After checking the channel occupancy time, the UE may identify the operation of the LAA communication module at operation S930.

Next, the UE determines at operation S940 whether the channel sensing function of the LAA module is turned on. Since the LAA communication module and the WLAN communication module operate in the same frequency band, the LAA communication module cannot use the frequency band during the channel occupancy time check by the WLAN communication module. Accordingly, if the LAA communication module performs channel sensing, this means unnecessary battery power consumption.

If it is determined that the channel sensing function is turned on, the UE at operation S950 may stop the channel sensing operation of the LAA communication module during the channel occupancy time. At this time, a management module of the UE may receive the channel sensing information including the channel occupancy time from the WLAN communication module and may control the operation of the LAA communication module during the channel occupancy time checked from the channel sensing information. It may also be possible for a transceiver of the LAA communication module to relay the channel occupancy time information from the WLAN communication module to a controller of the LAA communication module such that the controller of the LAA communication module controls the operation of the LAA communication module.

Meanwhile, the LAA communication module may receive the channel occupancy time information from the WLAN communication module and then request to the LTE system for resource allocation. For example, it may be possible for the UE to be scheduled to transmit a packet in the unlicensed frequency band. If the unlicensed frequency channel is occupied and if packet drop is expected because of an excessive number of packets in comparison with a predetermined duration even when attempting packet transmission in the unlicensed frequency band, the LAA communication module of the UE may request to the LTE system for allocation of licensed frequency band resources.

FIG. 9B is a diagram illustrating control and data packet structures according to an embodiment of the present disclosure.

Referring to FIG. 9B, the RTS and CTS packets with control information may include a duration field. A Wi-Fi AP or Wi-Fi Station generates the RTS or CTS packet having the duration field 960 including channel occupancy time determined as a result of channel sensing. If the RTS or CTS packet is received, the UE can check the channel occupancy time based on the information contained in the duration field 960 of the RTS or CTS packet.

The Wi-Fi AP or Wi-Fi Station may also transmit to the UE the data packet with the duration field 960 containing the channel occupancy time. The UE may check the channel occupancy time contained in the duration field 960 of the data packet.

Figure 9C:
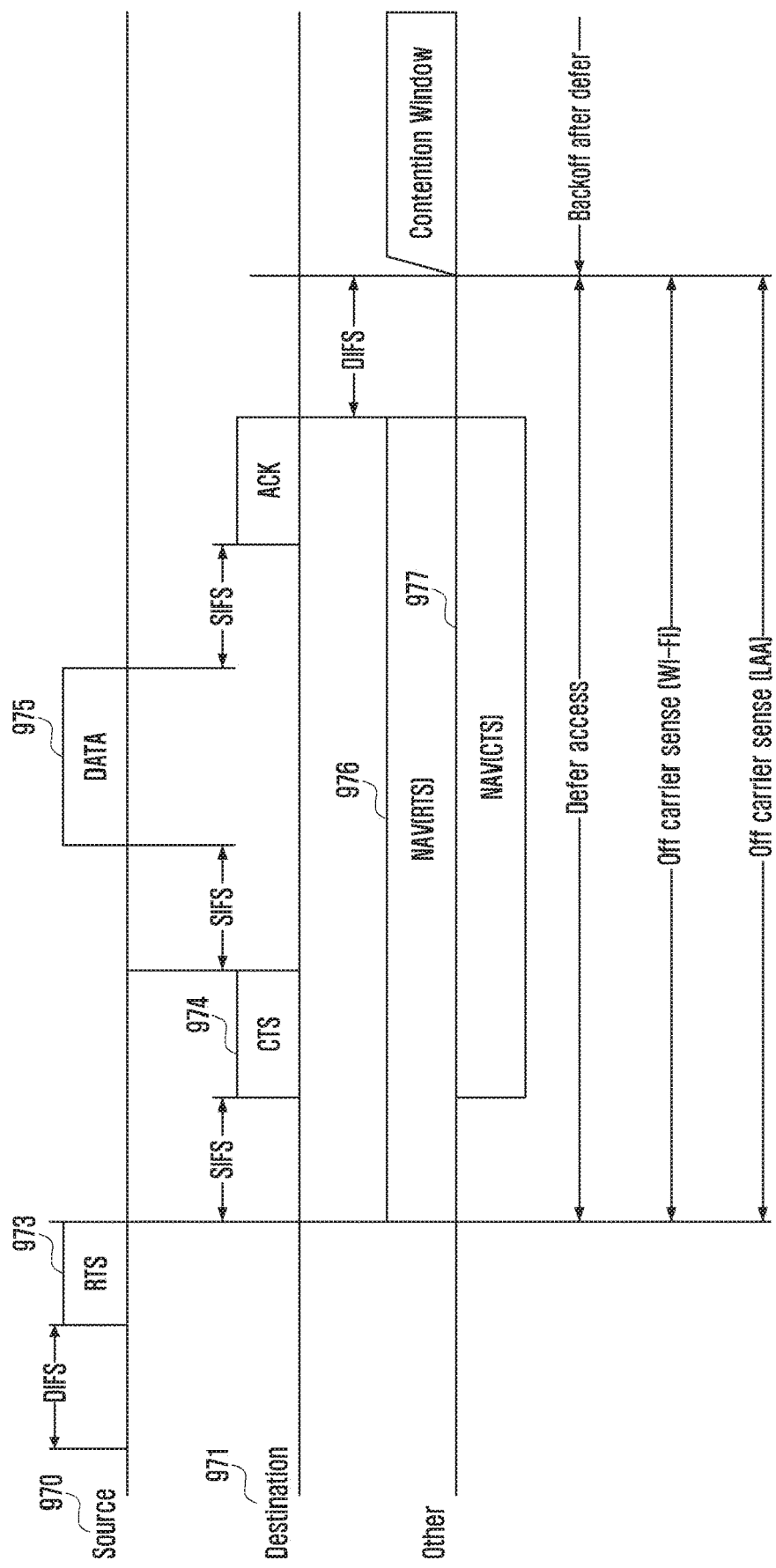
FIG. 9C is a timing diagram illustrating operation timings for source and destination and other nodes in association with checking channel occupancy time with control information according to an embodiment of the present disclosure.

FIG. 9C is a timing diagram illustrating operation timings for source and destination and other nodes in association with checking channel occupancy time with control information according to an embodiment of the present disclosure.

Referring to FIG. 9C, a transmitter (source node) 970 may transmit to a receiver (destination node) 971 an RTS packet 973 for checking channel status before transmitting a data packet, i.e., whether the destination node 971 is in a radio environment without any signal to transmit or receive. If it is possible to receive data packets, i.e., if the destination node that has received the RTS packet 973 is in a radio environment capable of transmitting/receiving data, the destination node may transmit to the source node 970 a CTS packet 974 indicating that data packet transmission is possible. In this case, the source node 970 may transmit the data packet 975 to the destination node 971. Here, each of the source and destination nodes 970 and 971 may be a Wi-Fi AP or Wi-Fi Station. For example, a Wi-Fi AP (Wi-Fi Station) may transmit an RTS packet to the Wi-Fi Station (Wi-Fi AP) and receive a CTS packet from the Wi-Fi AP (Wi-Fi Station). This embodiment is directed to a case where the UE receives an RTS or CTS packet to check the channel occupancy time. However, the present disclosure is not limited thereby.

If the RTS packet 973 or the CTS packet 974 is received, the UE may check the channel occupancy time contained in the duration field of the received packet. The channel occupancy time checked from the RTS packet 973 may be expressed as NAV (RTS) as denoted by reference number 976, and the channel occupancy time check from the CTS packet 974 may be expressed as NAV (CTS) as denoted by reference number 977. The UE may stop the channel sensing operation of the WLAN or LAA communication module during the channel occupancy time. The UE may stop the channel sensing operation of the WLAN or LAA communication module during the channel occupancy time or a time period calculated by adding a predetermined time to the channel occupancy time. It may also be possible for a management module of the UE to disable the channel sensing function of the LAA or WLAN communication module. It may also be possible for a transceiver of the LAA communication module to relay the channel sensing information including the channel occupancy time from the WLAN communication module to the controller of the LAA communication module such that the controller of the LAA communication module disables the channel sensing function of the LAA communication module.

Figure 9D:
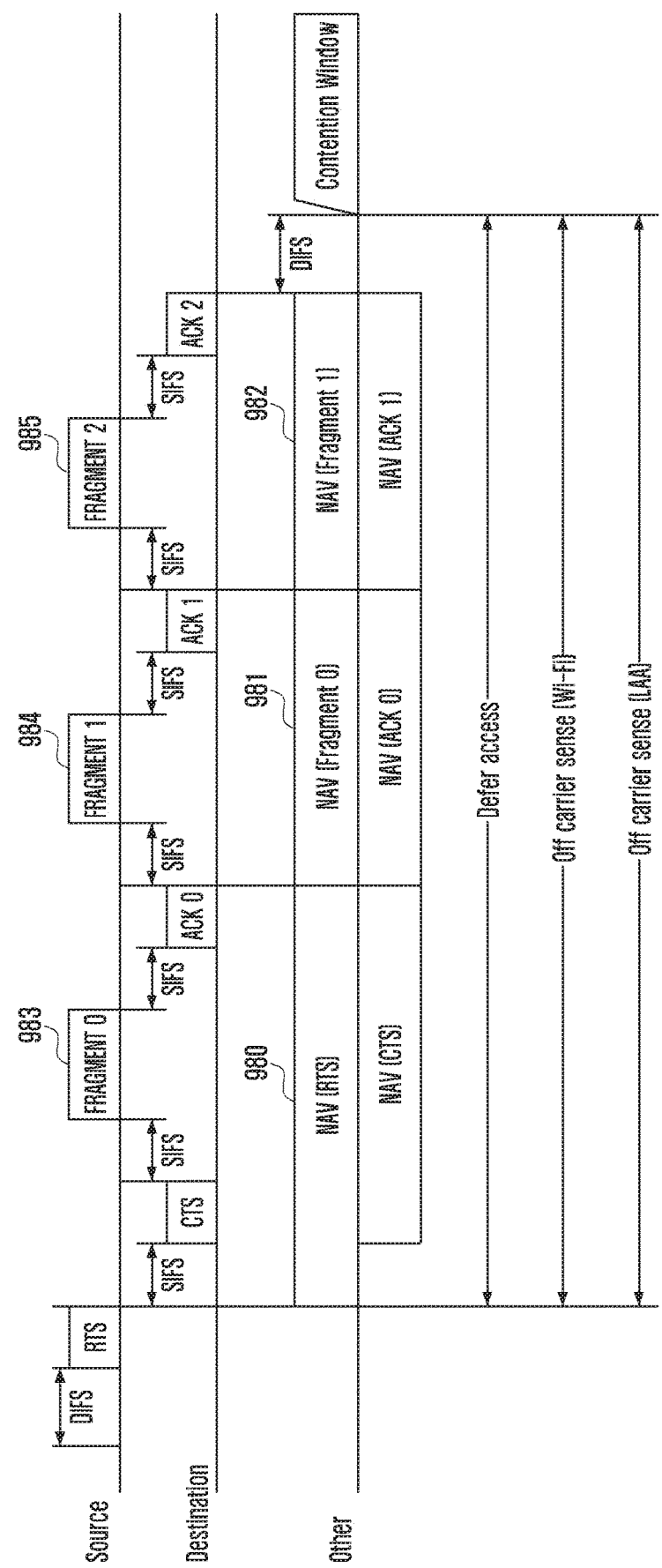
FIG. 9D is a timing diagram illustrating operation timings for source and destination and other nodes in association with checking channel occupancy time with control information according to an embodiment of the present disclosure.

FIG. 9D is a timing diagram illustrating operation timings for source and destination and other nodes in association with checking channel occupancy time with control information according to an embodiment of the present disclosure.

Referring to FIG. 9D is directed to a case where a UE checks the channel occupancy time based on the information included in a data packet.

The UE may check the channel occupancy time using an RTS packet or a CTS packet as described above. The UE may also check the channel occupancy time using a data packet even when it fails to receive the RTS or CTS packet. In detail, the UE may check the channel occupancy time using the duration information included in the header of a data packet. In this embodiment of the present disclosure, different types of channel occupancy time, i.e., NAV (RTS) 980, NAV (fragment 0) 981, and NAV (fragment 1) 982 may be referred to as first channel occupancy time, second channel occupancy time, and third channel occupancy time, respectively.

The UE may check the first channel occupancy time 980 using the received RTS or CTS packet.

The UE may also check the channel occupancy time using a data packet. The UE may check the first channel occupancy time 980 using the duration field included in the header of the received data (fragment 0) 983. The UE may check the second channel occupancy time 981 using the duration field included in the header of the received data (fragment 1) 984. The UE may also check the third channel occupancy time 982 using the duration field included in the header of the received data (fragment 2) 985. In this way, the UE may check the channel occupancy time and control to turn off the channel sensing function during the channel occupancy times.

After expiry of the third channel occupancy time 983, the UE may perform channel sensing by means of the WLAN communication module or the LAA communication module.

Figure 10A:
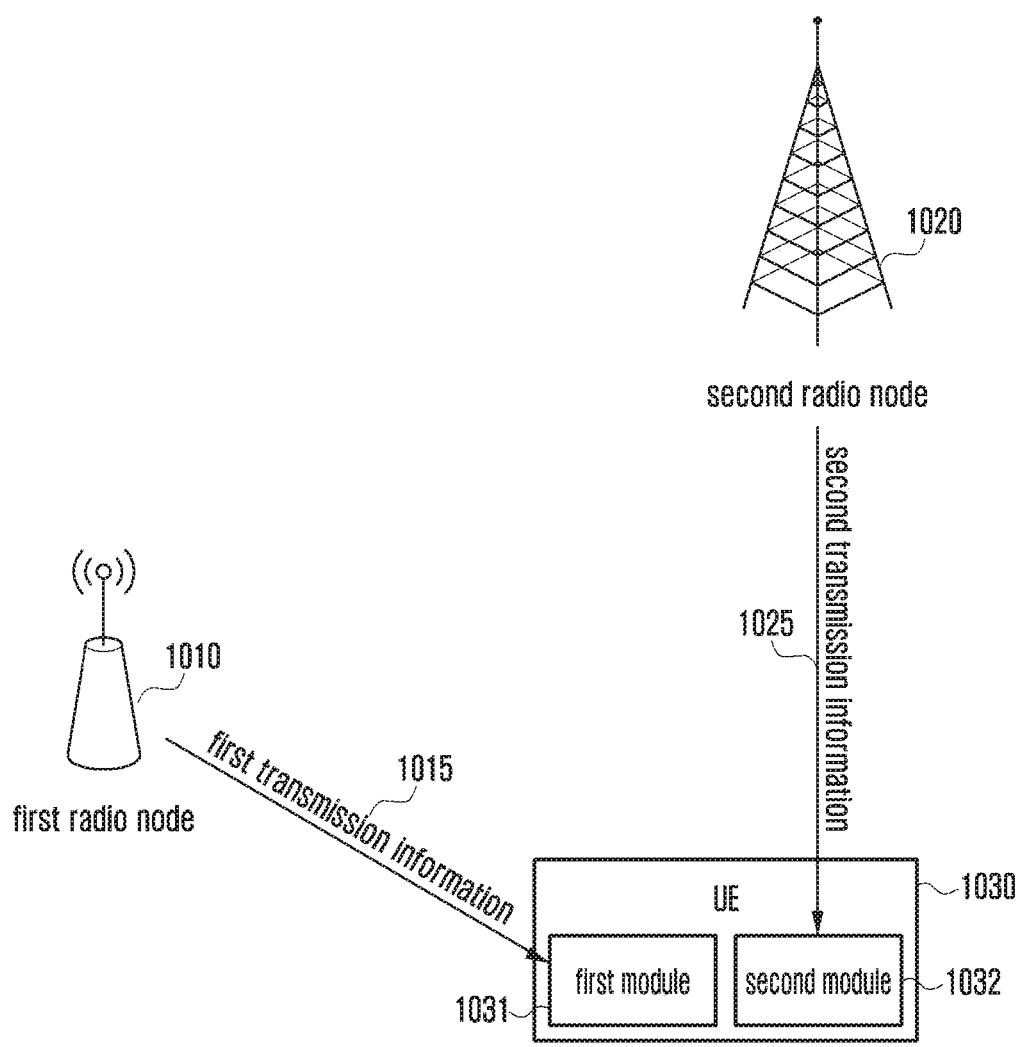
FIG. 10A is a diagram illustrating a network architecture according to an embodiment of the present disclosure.

FIG. 10A is a diagram illustrating a network architecture according to an embodiment of the present disclosure.

Referring to FIG. 10A, the network according to an embodiment of the present disclosure may include a first radio node 1010, a second radio node 1020, and a UE 1030. The UE 1030 may include a first module 1031 and a second module 1032. In an embodiment of the present disclosure, it is assumed that the first and second radio nodes 1010 and 1020 are a Wi-Fi AP and an LTE eNB respectively and the first and second modules are a WLAN communication module and an LAA communication module respectively. However, the scope of the present disclosure is not limited thereby. For example, an embodiment of the present disclosure may include a case where the first and second radio nodes are an LTE eNB and a Wi-Fi AP respectively and the first and second modules are an LAA communication module and a WLAN communication module respectively.

The first module 1031 of the UE 1030 may receive first transmission information from the first radio node 1010 as denoted by reference number 1015. The first transmission information may be carried in the RTS packet or CTS packet from a Wi-Fi AP. After receiving the first transmission information, the first module 1031 of the UE 1030 may determine whether the unlicensed frequency band channel is occupied and check the channel occupancy time based on the first transmission information. If the unlicensed frequency band channel is occupied, the first module 1031 of the UE 1030 may transmit channel occupancy time information to the second module 1032. If the channel occupancy time information is received, the second module 1032 disables its channel sensing function during the channel occupancy time to improve battery utilization efficiency of the UE.

Meanwhile, the second module 1032 of the UE 1030 may receive second transmission information from the second radio node 1020 as denoted by reference number 1025. The second transmission information may include the control information received through a PDCCH. The second transmission information may include unlicensed frequency channel occupancy time. The second transmission information may be generated with an LAA-RNTI. As a consequence, the UEs operating on the same frequency may decode the second transmission information with the LAA-RNTI to check the channel occupancy information included in the second transmission information.

If the second transmission information is received, the second module 1032 may decode the second transmission information with the LAA-RNTI to check the channel occupancy time. The second module 1032 may transmit the channel sensing information including the channel occupancy time to the first module 1031. Upon receipt of the channel sensing information, the second module 1032 may disable the channel sensing function during the channel occupancy time indicated by the channel sensing information to improve battery utilization efficiency of the UE 1030.

Figure 10B:
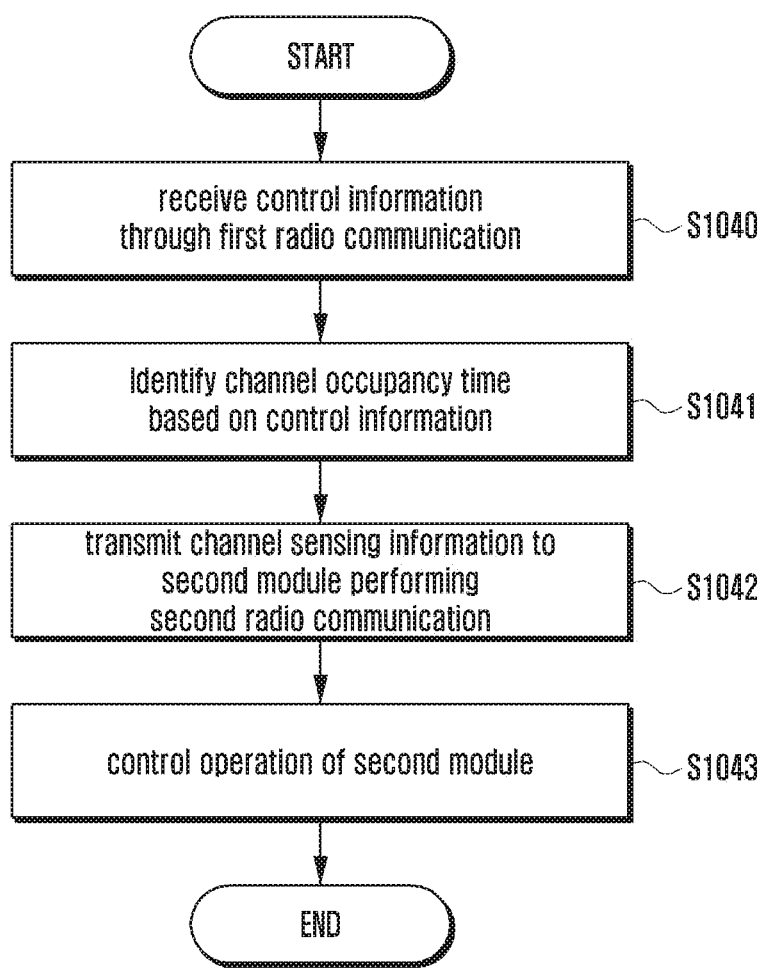
FIG. 10B is a flowchart illustrating a control information sharing method of a UE according to an embodiment of the present disclosure

FIG. 10B is a flowchart illustrating a control information sharing method of a UE according to an embodiment of the present disclosure.

Referring to FIG. 10B, the UE may receive control information through first radio communication at operation S1040. In detail, the UE may receive the control information through radio communication with an LTE eNB of an LAA system. The UE may also receive the control information through radio communication with a Wi-Fi AP.

If the control information is received, the UE may identify a channel occupancy time based on the control information at operation S1041. If the control information is received through radio communication with the LIE eNB, the UE may check the channel occupancy time with an LAA-RNTI. Otherwise, if the control information is received through radio communication with a Wi-Fi AP or a Wi-Fi Station, the UE may check the channel occupancy time by checking a duration field of an RTS packet, a CTS packet, or a data packet. How to check the channel occupancy time has been described above; thus, a detailed description thereof is omitted herein.

After checking the channel occupancy time, the UE may transmit the channel sensing information including the channel occupancy time to the second module at operation 1042. For example, if the first radio communication is performed with an LTE eNB, the UE may transfer the channel sensing information including the channel occupancy time to the WLAN communication module capable of communicating with a Wi-Fi AP or a Wi-Fi Station. Otherwise, if the first radio communication is performed with a Wi-Fi AP or a Wi-Fi Station, the UE may transfer the channel sensing information including the channel occupancy time to the LAA communication module capable of communicating with an LTE eNB.

If the channel sensing information is received, the second module may control its operation based on the channel sensing information at operation S1043. For example, the second module may turn off its channel sensing function during the channel occupancy time to improve battery utilization efficiency of the UE.

Figure 11:
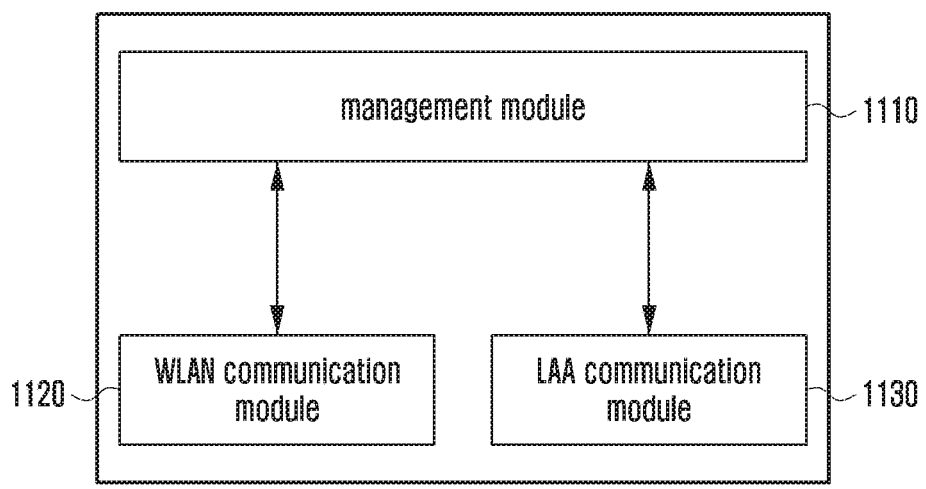
FIG. 11 is a block diagram illustrating a configuration of a UE according to an embodiment of the present disclosure

FIG. 11 is a block diagram illustrating a configuration of a UE according to an embodiment of the present disclosure.

Referring to FIG. 11, the UE according to an embodiment of the present disclosure may include a management module 1110, a WLAN communication module 1120, and a LAA communication module 1130. The embodiment of FIG. 11 is directed to the case where the management module 1110, the WLAN communication module 1120, and the LAA communication module 1130 are integrated into one chipset.

The WLAN communication module 1120 may perform radio communication with a Wi-Fi AP or a Wi-Fi Station to receive control information. The WLAN communication module 1120 may receive the control information carried in an RTS packet and a CTS packet to check the channel occupancy time. The WLAN communication module 1120 may also check the channel occupancy time carried in a data packet. The WLAN communication module 1120 may check the channel occupancy time and transmit the channel occupancy time information to the management module 1110.

The LAA communication module 1130 may perform radio communication with an eNB to receive the control information. The LAA communication module 1130 may decode the control information with an LAA-RNTI to check the channel occupancy time. The LAA communication module 1130 may check the channel occupancy time and transmit channel sensing information including the channel occupancy time to the management module 1110.

The management module 1110 may control the WLAN communication module 1120 and the LAA communication module 1130 to share the acquired information and operate based on the shared information.

In detail, the management module 1110 may transmit the channel sensing information provided by the WLAN communication module 1120 to the LAA communication module 1130. The management module 1110 may also transmit the channel sensing information acquired from the LAA communication module 1130 to the WLAN communication module 1120.

The management module 1110 may control the operations of the WLAN communication module 1120 and the LAA communication module 1130. In detail, the management module 1110 may receive the channel sensing information from the WLAN communication module 1120 and control the operation of the LAA communication module 1130 based on the channel occupancy time included in the channel sensing information. For example, the management module 1110 may power off the LAA communication module based on the channel occupancy time. The management module 1110 may also turn on a power saving mode of the LAA communication module 1130. The management module 1110 may also turns off the channel sensing function of the LAA communication module 1130. Likewise, the management module 1110 may receive the channel sensing information from the LAA communication module 1130 and control the operation of the WLAN communication module 1120 based on the channel occupancy time included in the channel sensing information. For example, the management module 1110 may power off the WLAN communication module 1120, turn on the power saving mode of the WLAN communication module 1120, or turn off the channel sensing function of the WLAN communication module 1120.

Figure 12:
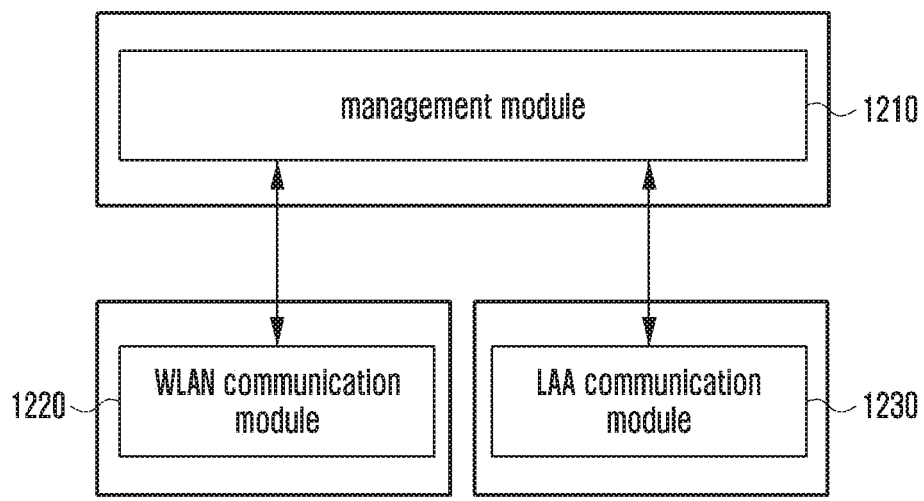
FIG. 12 is a block diagram illustrating a configuration of a UE according to an embodiment of the present disclosure.

FIG. 12 is a block diagram illustrating a configuration of a UE according to an embodiment of the present disclosure.

Referring to FIG. 12, the UE according to an embodiment of the present disclosure includes a management module 1210, a WLAN communication module 1220, and an LAA communication module 1230. The embodiment of FIG. 12 is directed to a case where the management module 1210, the WLAN communication module 1220, and the LAA communication module 1230 are implemented in separate chipsets.

The WLAN communication module 1220 may perform radio communication with a Wi-Fi AP or a Wi-Fi Station to receive control information. The WLAN communication module 1220 may receive the control information carried in a RTS packet and a CTS packet to check the channel occupancy time. The WLAN communication module 1220 may also check the channel occupancy time carried in a data packet. The WLAN communication module 1220 may check the channel occupancy time and transmit the channel occupancy time information to the management module 1210. Since the WLAN communication module 1220 and the management module 1210 are included in different chipsets, a communication protocol may be defined between the WLAN communication module 1220 and the management module 1210 to exchange channel occupancy time information and other control information.

The LAA communication module 1230 may perform radio communication with an eNB to receive the control information. The LAA communication module 1230 may decode the control information with an LAA-RNTI to check the channel occupancy time. The LAA communication module 1230 may check the channel occupancy time and transmit channel sensing information including the channel occupancy time to the management module 1210. Since the LAA communication module 1230 and the management module 1210 are included in different chipsets, a communication protocol may be defined between the LAA communication module 1230 and the management module 1210.

The management module 1210 may control the WLAN communication module 1220 and the LAA communication module 1230 to share the acquired information and operate based on the shared information. At this time, the management module may exchange information with the WLAN communication module 1220 and the LAA communication module 1230 using the communication protocols defined respectively for communications with them.

The management module 1210 controls the WLAN communication module 1220 and the LAA communication module 1230 to share the acquired information and operate based on the information as described with reference to FIG. 11; thus, a detailed description thereof is omitted herein.

Figure 13:
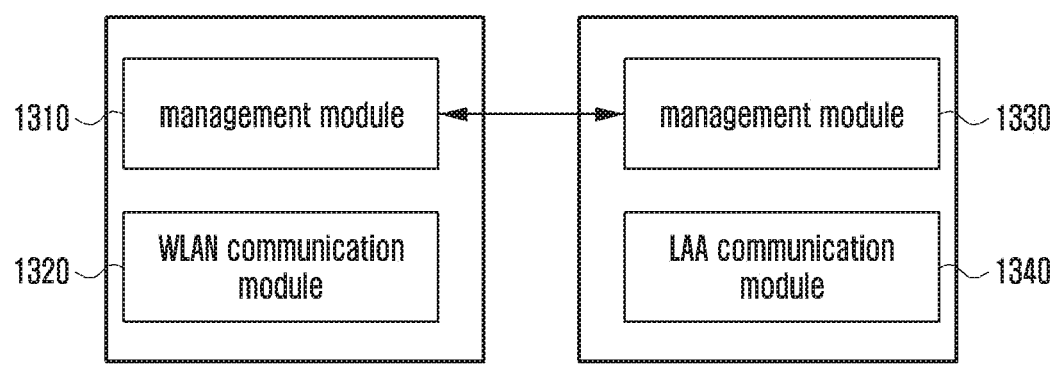
FIG. 13 is a block diagram illustrating a configuration of a UE according to an embodiment of the present disclosure.

FIG. 13 is a block diagram illustrating a configuration of a UE according to an embodiment of the present disclosure.

Referring to FIG. 13, the UE according to an embodiment of the present disclosure may include a WLAN communication module 1320 and an LAA communication module 1340. The WLAN communication module 1320 and the LAA communication module 1340 are implemented in different chipsets which include respective management modules 1310 and 1330.

The WLAN communication module 1320 may perform radio communication with a Wi-Fi AP or a Wi-Fi Station to receive control information. The WLAN communication module 1320 may receive the control information carried in an RTS packet and a CTS packet to check the channel occupancy time. The WLAN communication module 1320 may also check the channel occupancy time carried in a data packet. The WLAN communication module 1320 may check the channel occupancy time and transmit the channel occupancy time information to the management module 1310 implemented in the same chipset.

The LAA communication module 1340 may perform radio communication with an eNB to receive the control information. The LAA communication module 1340 may decode the control information with an LAA-RNTI to check the channel occupancy time. The LAA communication module 1340 may check the channel occupancy time and transmit channel sensing information including the channel occupancy time to the management module 1330 implemented in the same chipset.

The management modules 1310 and 1330 may control the WLAN communication module 1320 and the LAA communication module 1340 to share the acquired information and operate based on the shared information.

In detail, the management module 1310 may transmit the channel sensing information provided by the WLAN communication module 1320 to the management module 1330. In addition, the management module 1330 may transmit the channel sensing information provided by the LAA communication module 1340 to the management module 1310.

If the channel sensing information is received, the management modules 1310 and 1330 may control the operations of the WLAN communication module 1320 and the LAA communication module 1340, respectively, based on the channel sensing information. In detail, if the channel sensing information is received from the management module 1310 managing the WLAN communication module 1320, the management module 1330 may control the operation of the LAA communication module 1340 based on the channel occupancy time included in the channel sensing information. For example, the management module 1330 may power off the LAA communication module 1340 based on the channel occupancy time. The management module 1330 may also turn on the power saving mode of the LAA communication module 1340. The management module 1330 may also turn off the channel sensing function of the LAA communication module 1340. Likewise, the management module 1310 may receive the channel sensing information from the management module 1330 managing the LAA communication module 1340 and control the operation of the WLAN communication module 1320 based on the channel occupancy time included in the channel sensing information. For example, the management module 1310 may power off the WLAN communication module 1320, turn on the power saving mode of the WLAN communication module 1320, or turn off the channel sensing function of the WLAN communication module 1320.

Each of the chipset including the WLAN communication module 1320 and the chipset including the LAA communication module 1340 may have no management module. That is the management modules 1310 and 1330 may be replaced by controllers for controlling them respectively.

Figure 14:
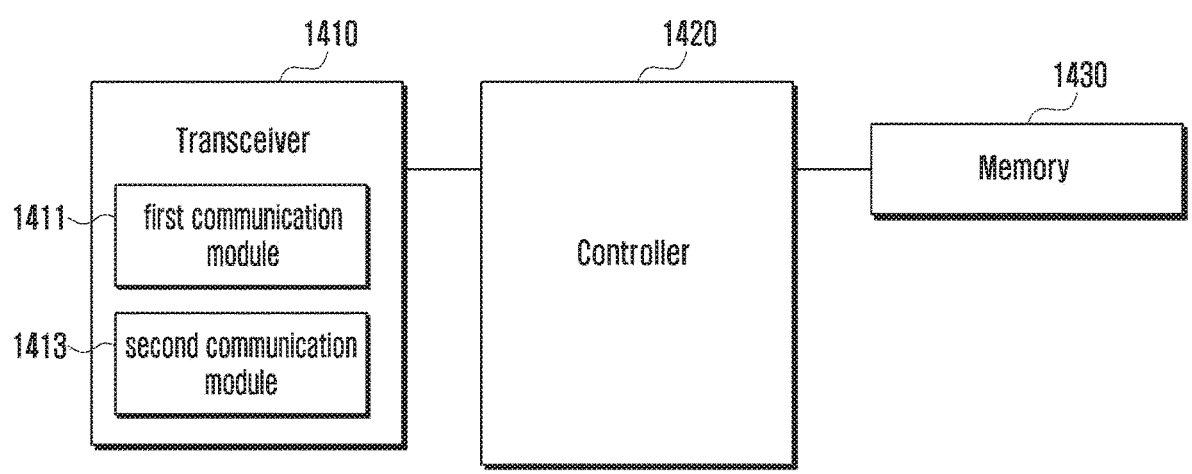
FIG. 14 is a block diagram illustrating a configuration of a UE according to an embodiment of the present disclosure.

FIG. 14 is a block diagram illustrating a configuration of a UE according to an embodiment of the present disclosure.

Referring to FIG. 14, the UE according to an embodiment of the present disclosure may include a transceiver 1410, a controller 1420, and a memory 1430. The transceiver can be referred to communication unit, and the controller can be referred to control unit, and the memory can be referred to storage unit. In addition, when defining a controller in the specification, it may be stated that "the controller may be a circuit, an application-specific integrated circuit or at least one processor."

This embodiment is directed to a case where the transceiver 1410 includes a first communication module 1411 and a second communication module 1413. However, the first and second communication modules 1411 and 1413 may be included in the controller 1420. One of the first and second communication modules 1411 and 1413 may be a WLAN communication module and the other an LAA communication module, or vice versa. The WLAN and LAA communication modules may be included in a controller or a transceiver as described with reference to FIGS. 11 to 13.

The transceiver 1410 may communicate with a network entity. The transceiver 1410 may receive control information transmitted by an eNB using at least one of the first and second communication modules 1411 and 1413. The transceiver 1410 may receive a radio identifier for use in decoding the control information.

The controller 1420 may control the transceiver 1410 to receive the control information by means of at least one of the first and second communication modules 1411 and 1413. The controller 1420 may also decode the control information to check unlicensed frequency channel occupancy time. The controller 1420 may decode the control information with a radio identifier commonly allocated to all UEs. The controller 1420 may check the channel occupancy time carried in an RTS packet, a CTS packet, or a data packet transmitted by a Wi-Fi AP or a Wi-Fi Station. The controller 1420 may also generate channel occupancy information including the channel occupancy time and transmit the channel occupancy information to another communication module operating in the same frequency band. The controller 1420 may also control the operation of another communication module based on the channel occupancy time.

The memory 1430 may store the radio identifier for use in decoding the control information. The memory 1430 may also store the checked channel occupancy time.

Figure 15:
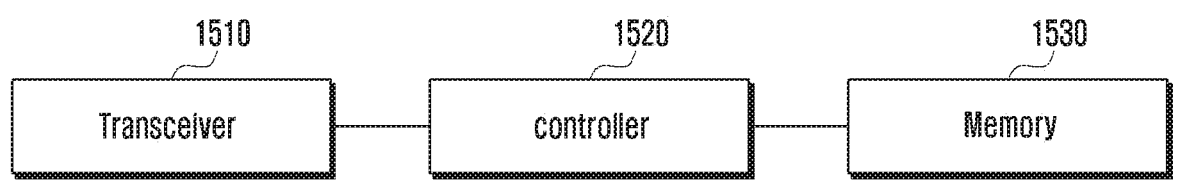
FIG. 15 is a block diagram illustrating a configuration of a wireless local area network (WLAN) communication module of a UE according to an embodiment of the present disclosure.

FIG. 15 is a block diagram illustrating a configuration of a WLAN communication module of a UE according to an embodiment of the present disclosure.

Referring to FIG. 15, the WLAN communication module may include a transceiver 1510, a controller 1520, and a memory 1530. The transceiver can be referred to communication unit, and the controller can be referred to control unit, and the memory can be referred to storage unit. In addition, when defining a controller in the specification, it may be stated that "the controller may be a circuit, an application-specific integrated circuit or at least one processor."

The transceiver 1510 may communicate with a network entity. The transceiver 1510 may perform radio communication with a Wi-Fi AP or a Wi-Fi Station to receive control information. The transceiver 1510 may receive channel sensing information from an LAA communication module or a management module.

The controller 1520 may check an unlicensed frequency channel occupancy time based on the received control information. The controller 1520 may check the channel occupancy time based on the information contained in a duration field of an RTS packet, a CTS packet, or a data packet. The controller 1520 may control to transfer the channel sensing information including the channel occupancy time to an LAA communication module or a management module.

The controller 1520 may check the channel occupancy time based on the channel sensing information received from the LAA communication module or the management module. The controller 1520 may control the operation of the WLAN communication module based on the channel occupancy time. In detail, the controller 1520 may control to power off the WLAN communication module, turn on the power saving mode of the WLAN communication module, or turn off the channel sensing function of the WLAN communication module.

The memory 1530 may store the information on the channel occupancy time acquired from the control information. The memory 1530 may store the channel sensing information received from the LAA communication module or the management module.

Figure 16:
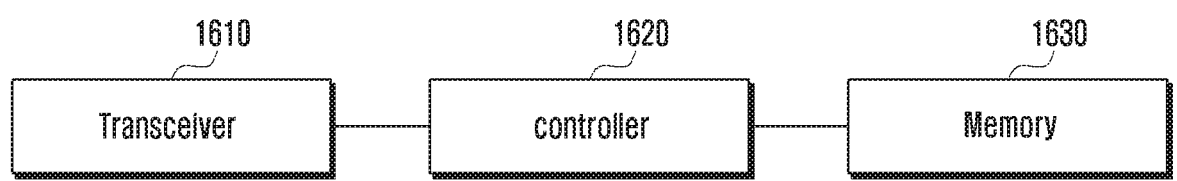
FIG. 16 is a block diagram illustrating an LAA communication module of a UE according to an embodiment of the present disclosure

FIG. 16 is a block diagram illustrating an LAA communication module of a UE according to an embodiment of the present disclosure.

Referring to FIG. 16, the LAA communication module may include a transceiver 1610, a controller 1620, and a memory 1630. The transceiver can be referred to communication unit, and the controller can be referred to control unit, and the memory can be referred to storage unit. In addition, when defining a controller in the specification, it may be stated that "the controller may be a circuit, an application-specific integrated circuit or at least one processor."

The transceiver 1610 may communicate with a network entity. The transceiver 1610 may perform radio communication with an eNB to receive control information. The transceiver 1610 may receive channel sensing information from a WLAN communication module or a management module.

The controller 1620 may check unlicensed frequency channel occupancy time based on the control information. The controller 1620 may check the channel occupancy time based on the control information received through a control channel, a data channel, or a separate channel during at least one subframe. In detail, the controller 1620 may decode the control information with an LAA-RNTI to check the channel occupancy time. The controller 1620 may also control to transfer the channel sensing information including the channel occupancy time to the WLAN communication module of the management module.

The controller 1620 may also check the channel occupancy time based on the channel sensing information received from the WLAN communication module or the management module. The controller 1620 may control the operation of the LAA communication module based on the channel occupancy time. In detail, the controller 1620 may control to power off the LAA communication module, turn on the power saving mode of the LAA communication module, or turn off the channel sensing function of the LAA communication module.

The memory 1630 may store an LAA-RNTI for use in decoding the control information. The memory 1630 may also store the channel occupancy time acquired from the control information. The memory 1630 may store the channel sensing information received from the LAA communication module or the management module.

Figure 17:
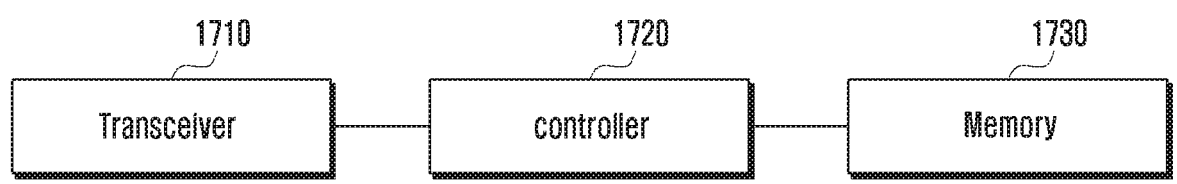
FIG. 17 is a block diagram illustrating a configuration of a management module of a UE according to an embodiment of the present disclosure.

FIG. 17 is a block diagram illustrating a configuration of a management module of a UE according to an embodiment of the present disclosure.

Referring to FIG. 17, the management module may include a transceiver 1710, a controller 1720, and a memory 1730. The transceiver can be referred to communication unit, and the controller can be referred to control unit, and the memory can be referred to storage unit. In addition, when defining a controller in the specification, it may be stated that "the controller may be a circuit, an application-specific integrated circuit or at least one processor."

The transceiver 1710 may communicate with a network entity. The transceiver 1710 may receive channel sensing information from a WLAN communication module or a LAA communication module.

The controller 1720 may control the WLAN communication module to transfer the channel sensing information to the LAA communication module. The controller 1720 may control the LAA communication module to transfer the channel sensing information to the WLAN communication module.

The controller 1720 may check the channel occupancy time based on the channel sensing information received from the WLAN communication module or the LAA communication module. The controller 1720 may control the operation of the LAA communication module or the WLAN communication module based on the channel occupancy time. In detail, the controller 1720 may control to power off the LAA communication module or the WLAN communication module, turn on the power saving mode of the communication module, or turn off the channel sensing function of the communication module.

The memory 1730 may store the channel sensing information received from the LAA communication module or the WLAN communication module.

Figure 18:
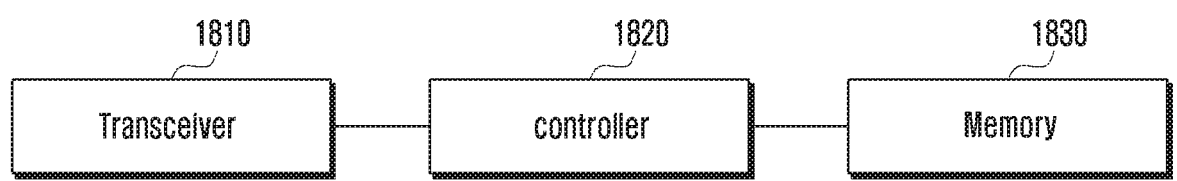
FIG. 18 is a block diagram illustrating a configuration of an eNB according to an embodiment of the present disclosure.

FIG. 18 is a block diagram illustrating a configuration of an eNB according to an embodiment of the present disclosure.

Referring to FIG. 18, the eNB according to an embodiment of the present disclosure may include a transceiver 1810, a controller 1820, and a memory 1830. The transceiver can be referred to communication unit, and the controller can be referred to control unit, and the memory can be referred to storage unit. In addition, when defining a controller in the specification, it may be stated that "the controller may be a circuit, an application-specific integrated circuit or at least one processor."

The transceiver 1810 may communicate with another network entity. The transceiver 1810 may generate control information to the UE and receive data from the UE.

The controller 1820 may check the scheduling information for the UE supporting LAA and determine integrated channel occupancy time that is common to all UEs. The controller 1820 may also generate the control information based on the channel occupancy time and an LAA-RNTI. In detail, the controller 1820 may add CRC to downlink transmission information including the channel occupancy time and scramble the CRC with the LAA-RNTI to generate the control information. The controller 1820 may transmit the control information to the UE.

The controller 1820 may also control to transmit the information related to the LAA-RNTI for use in generating the control information to the UE.

The memory 1830 may store the LAA-RNTI information. The memory 1830 may store scheduling information per UE.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

As described above, the control information utilization apparatus and method of the present disclosure is advantageous by enabling all terminals operating in the same frequency band to check their unlicensed frequency occupancy status by allowing each terminal to decode control information received with an LAA-radio identifier.

In addition, the control information utilization apparatus and method of the present disclosure is advantageous in terms of improving battery utilization efficiency by allowing a terminal equipped with two heterogeneous communication modules operating on the same frequency to use the information on the unlicensed band frequency occupancy status sensed by one communication module for the operation of the other communication module.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal including a first module and a second module in a wireless communication system, the method comprising:
   receiving by the first module operating in a licensed frequency band and an unlicensed frequency band, control information on the licensed frequency band from a base station;
   identifying, by the first module, channel occupancy time of the unlicensed frequency band by decoding the control information based on a licensed assisted access (LAA) radio network temporary identifier (RNTI) that is for scheduling LAA transmission and reception;
   transferring, by the first module the channel occupancy time to the second module operating in the same frequency band as the unlicensed frequency band of the first module; and
   stopping, by the second module, sensing of a channel of the unlicensed frequency band during the channel occupancy time.

2. The method of claim 1, wherein receiving the control information comprises:
   monitoring, by the first module, a common search space of a control channel in the licensed frequency band; and
   decoding the control information based on the LAA-RNTI.

3. The method of claim 1, wherein the control information includes a cyclic redundancy check scrambled based on the LAA-RNTI.

4. A method of a base station in a mobile communication system, the method comprising:
   identifying scheduling information for terminals;
   determining a channel occupancy time of an unlicensed frequency band for each terminal based on the scheduling information;
   generating control information including the channel occupancy time based on a licensed assisted access (LAA) radio network temporary identifier (RNTI) that is for scheduling LAA transmission and reception; and
   transmitting, to a first module of the terminal, the control information on a licensed frequency band, the first module operating in the licensed frequency band and an unlicensed frequency band,
   wherein the channel occupancy time is transferred to a second module of the terminal from the first module to stop sensing of a channel of the unlicensed frequency band during the channel occupancy time, the second module operating in the same frequency band as the unlicensed frequency band of the first module.

5. The method of claim 4, wherein generating the control information further comprises:
   adding a cyclic redundancy check (CRC) to the control information including the channel occupancy time; and
   scrambling the CRC with the LAA-RNTI.

6. The method of claim 4, wherein the control information is transmitted on a common search space.

7. A terminal in a mobile communication system, the terminal comprising:
   a first module configured to perform a first radio communication;
   a second module configured to perform a second radio communication; and
   at least one processor configured to:
      control the first module operating in a licensed frequency band and an unlicensed frequency band to:
         receive control information on the licensed frequency band from a base station,
         identify channel occupancy time of the unlicensed frequency band by decoding the control information based on a licensed assisted access (LAA) radio network temporary identifier (RNTI) that is for scheduling LAA transmission and reception,
         transfer the channel occupancy time to the second module operating in the same frequency band as the unlicensed frequency band of the first module, and
      control the second module to stop sensing of a channel of the unlicensed frequency band during the channel occupancy time.

8. The terminal of claim 7, wherein the at least one processor is further configured to:
   monitor a common search space of a control channel in the licensed frequency band; and
   decode the control information based on the LAA-RNTI.

9. The terminal of claim 7, wherein the control information includes a cyclic redundancy check scrambled based on the LAA-RNTI.

10. A base station in a mobile communication system, the base station comprising:
    a transceiver; and
    at least one processor coupled with the transceiver and configured to:
       identify scheduling information for terminals,
       determine a channel occupancy time of an unlicensed frequency band for each terminal based on the scheduling information,
       generate control information including the channel occupancy time based on a licensed assisted access (LAA) radio network temporary identifier (RNTI) that is for scheduling LAA transmission and reception, and
       transmit, to a first module of the terminal, the control information on a licensed frequency band, the first module operating in the licensed frequency band and an unlicensed frequency band,
    wherein the channel occupancy time is transferred to a second module of the terminal from the first module to stop sensing of a channel of the unlicensed frequency band during the channel occupancy time, the second module operating in a same frequency band as the unlicensed frequency band of the first module.

11. The base station of claim 10,
    wherein the at least one processor is further configured to:
       add a cyclic redundancy check (CRC) to the control information including the channel occupancy time, and
       scramble the CRC with the LAA-RNTI.

12. The base station of claim 10, wherein the at least one processor is further configured to control the transceiver to transmit the control information on a common search space.

* * * * *